(12) United States Patent
Kodama et al.

(10) Patent No.: US 8,246,065 B1
(45) Date of Patent: Aug. 21, 2012

(54) HEIGHT ADJUSTABLE SEATPOST ASSEMBLY

(75) Inventors: Michihiro Kodama, Osaka (JP); Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/175,980

(22) Filed: Jul. 5, 2011

(51) Int. Cl.
*B62K 15/00* (2006.01)

(52) U.S. Cl. .................................. 280/287; 280/278

(58) Field of Classification Search .............. 280/287, 280/278
See application file for complete search history.

(56) References Cited

U.S. PATENT DOCUMENTS

| | | | | |
|---|---|---|---|---|
| 2,528,607 A | * | 11/1950 | Preising et al. | 248/594 |
| 4,688,817 A | * | 8/1987 | Marier | 280/278 |
| 6,176,459 B1 | * | 1/2001 | Wilcox et al. | 248/371 |
| 7,083,180 B2 | | 8/2006 | Turner | |

FOREIGN PATENT DOCUMENTS

| | | |
|---|---|---|
| JP | 2003-165474 A | 6/2003 |
| JP | 2005-231567 A | 9/2005 |
| JP | 2005-262900 A | 9/2005 |
| JP | 2006-56285 A | 3/2006 |
| JP | 2006-123882 A | 5/2006 |
| WO | WO 2004/023937 A1 | 3/2004 |

OTHER PUBLICATIONS

U.S. Appl. No. 12/710,563, filed Feb. 23, 2010, Kodama et al.

* cited by examiner

*Primary Examiner* — Tashiana Adams
(74) *Attorney, Agent, or Firm* — Global IP Counselors, LLP

(57) ABSTRACT

A height adjustable seatpost assembly is provided with first and second tubes that are telescopically arranged to change an overall length of the height adjustable seatpost assembly using first and second ratchet arrangements. The first ratchet arrangement includes a set of first ratchet teeth having a first pitch and a first stop pawl member being movably coupled with respect to the first ratchet teeth between a first lock position and a first free position. The second ratchet arrangement includes a set of second ratchet teeth having a second pitch that is smaller than the first pitch and a second stop pawl member being movably coupled with respect to the second ratchet teeth between a second lock position and a second free position. The stop pawl members engage the ratchet teeth in the lock positions to prevent expansion of the first and second tubes.

11 Claims, 18 Drawing Sheets

HEIGHT ADJUSTABLE SEATPOST ASSEMBLY

BACKGROUND

1. Field of the Invention

This invention generally relates to a seatpost that is adjustable to change a seat height of a bicycle seat.

2. Background Information

A bicycle seat is normally supported on a bicycle frame by a seatpost that is telescopically disposed in the seat tube of the bicycle frame. The bicycle seat typically has a pair of parallel rails extending along the bottom of the seat. The rails of the bicycle seat are attached to the seatpost by a clamp at the top of the seatpost. The height of the bicycle seat with respect to the bicycle frame is typically adjusted by changing an insertion amount of the seatpost in the seat tube of the bicycle frame. The upper end of the seat tube is typically provided with a longitudinal slit and a clamping arrangement that adjusts the diameter of the upper end of the seat tube to squeeze the seatpost for securing the seatpost in the desired position with respect to the bicycle frame.

Recently, seatpost have been proposed that various adjustment mechanism in order to adjust the height of the seat. In some conventional mechanical bicycle seatpost adjustment mechanisms, a manual lever is provided for changing the seat height using a piston type telescopic tube arrangement such as disclosed in U.S. Pat. No. 7,083,180. Also motorized seatpost assemblies have been proposed for changing the seat height. Examples of motorized seatpost assemblies are disclosed in Japanese Laid-Open Patent Application No. 2005-231567 and Japanese Laid-Open Patent Application No. 2005-262900. In these motorized seatpost assemblies, when the rider sit down the seat, the force is transmitted to the height adjustment mechanism, which impart undesirable stresses on the height adjustment mechanism.

SUMMARY

One object of the present invention is to provide a height adjustable seatpost assembly that has a pair of ratchet mechanisms so that the height of the seat can be easily set to a desired seat position.

In view of the state of the known technology, a height adjustable seatpost assembly is provided with first and second tubes, a first ratchet arrangement and a second ratchet arrangement. The first and second tubes are telescopically arranged. The first and second tubes are actuated with respect to each other to change an overall length of the height adjustable seatpost assembly. The first ratchet arrangement includes a set of first ratchet teeth having a first pitch and a first stop pawl member being movably coupled with respect to the first ratchet teeth between a first lock position and a first free position. The first stop pawl member is engaged with one of the first ratchet teeth in the first lock position to prevent contraction of the first and second tubes. The second ratchet arrangement includes a set of second ratchet teeth having a second pitch that is smaller than the first pitch and a second stop pawl member being movably coupled with respect to the second ratchet teeth between a second lock position and a second free position. The second stop pawl member is engaged with one of the second ratchet teeth in the second lock position to prevent expansion of the first and second tubes.

These and other objects, features, aspects and advantages of the height adjustable seatpost assembly ill become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
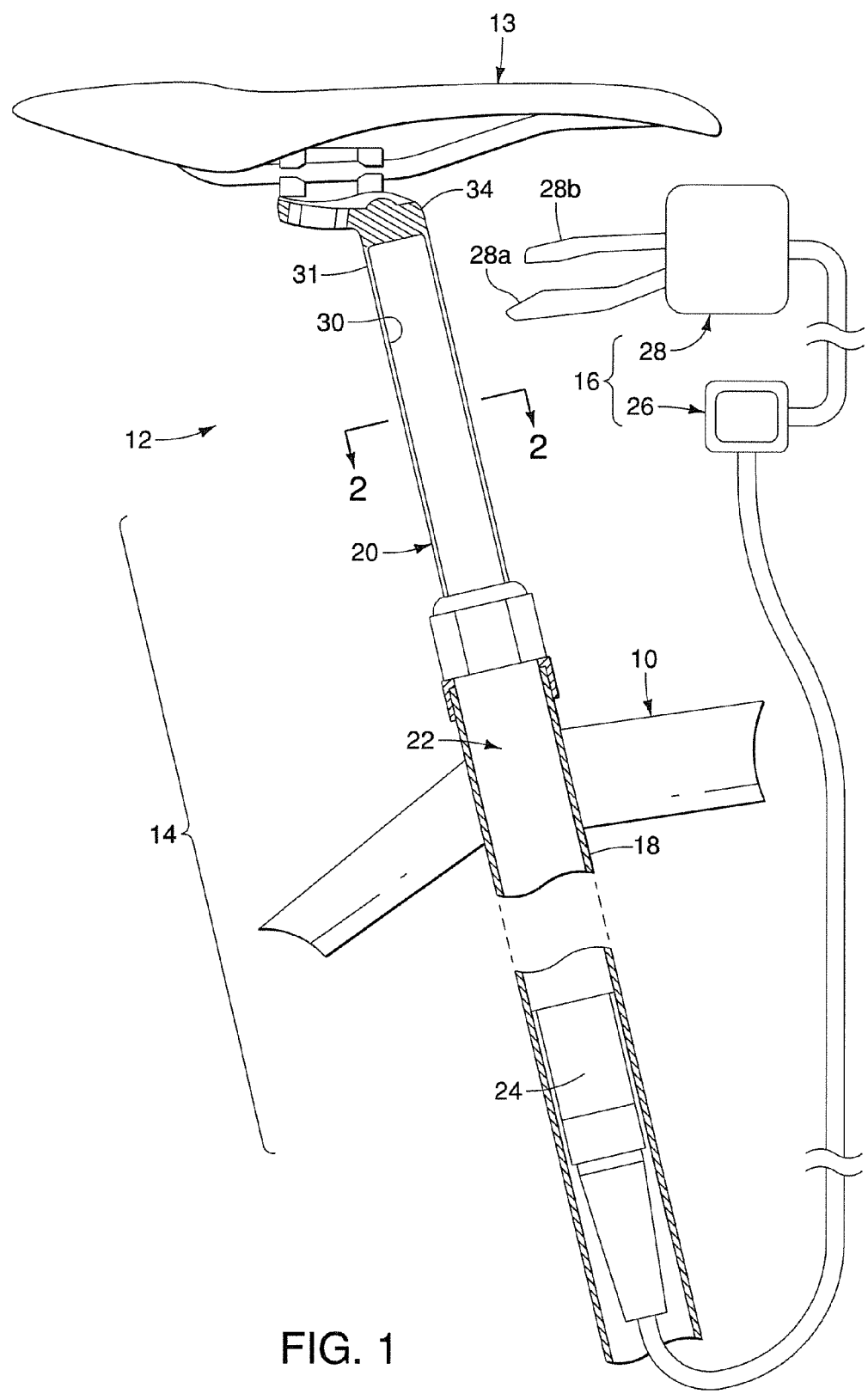
FIG. 1 is a partial side elevational view of a bicycle that is equipped with a height adjustable seatpost assembly in accordance with one embodiment.

Referring initially to FIG. 1, a portion of a bicycle 10 is illustrated that is equipped with a height adjustable seatpost assembly 12 in accordance with one embodiment. The height adjustable seatpost assembly 12 is a motorized assembly for adjusting a seat height of a bicycle seat 13. The height adjustable seatpost assembly 12 includes a telescoping seatpost part 14 and a control part 16 for adjusting a seat height of a bicycle seat 13. The telescoping seatpost part 14 is mounted to a seat tube 18 of the bicycle 10, while the control part 16 is mounted to a handlebar of the bicycle 10.

As seen in FIG. 1, the telescoping seatpost part 14 mainly includes an inner (first) tube 20, an outer (second) tube 22 and a height adjustment device 24, while the control part 16 includes a controller 26 and a user operating switch or device 28. The height adjustable seatpost assembly 12 adjusts a seat height of the bicycle seat 13 with respect to the seat tube 18. The seat tube 18 is a conventional portion of a bicycle frame that includes a clamping arrangement (not shown) for securing the height adjustable seatpost assembly 12 to the bicycle frame. In this embodiment, the length of the telescoping seatpost part 14 is adjustable to a plurality of seatpost positions between a top seatpost position and a bottom seatpost position. However, using the control part 16, the telescoping seatpost part 14 can be operated to a selected number of preset seatpost positions, e.g., a bottom preset seatpost position, a lower middle preset seatpost position, an upper middle preset seatpost position, and a top preset seatpost position, if desired.

Figure 2:
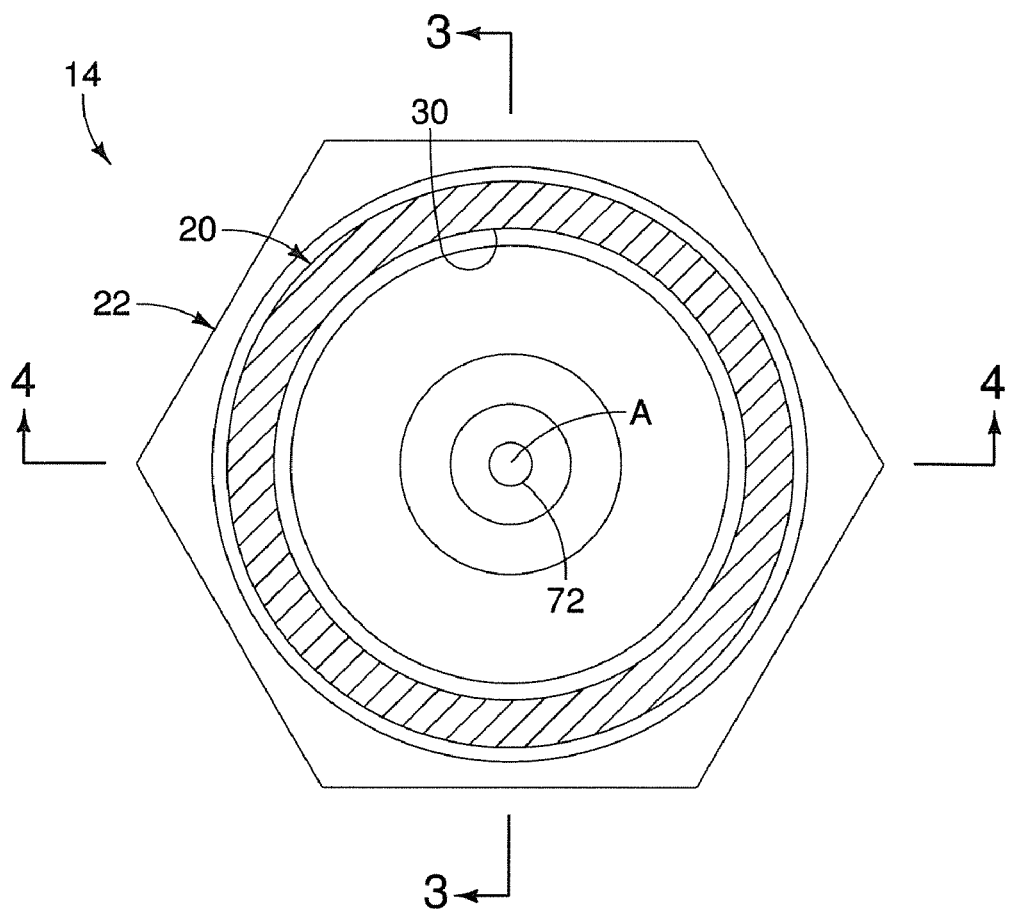
FIG. 2 is an enlarged transverse cross sectional view of a portion of the telescoping seatpost part as seen along section line 2-2 of FIG. 1.

In general, the inner and outer tubes 20 and 22 are telescopically arranged with respect to each other, with the amount of insertion of the inner tube 20 into the outer tube 22 being adjustable in response to the rider operating the user operating device 28. Thus, the inner and outer tubes 20 and 22 has a common longitudinal axis A in the illustrated embodiment as seen in FIG. 2. In the illustrated embodiment, as seen in FIG. 1, the user operating device 28 has a first lever or operating member 28a for raising the seat 13 and a second lever or operating member 28b for lowering the seat 13. Of course, other types of user operating devices can be used as needed and/or desired.

In the illustrated embodiment, the inner and outer tubes 20 and 22 are a separate unit from the seat tube 18 such that the outer tube 22 is easily installed into the seat tube 18 as seen in FIG. 1. The outer tube 22 is secured to the seat tube 18 by a conventional clamping arrangement (not shown) provided on the upper end of the seat tube 18. In particular, the upper end of the seat tube 18 is provided with a longitudinal slit such that the clamping arrangement adjusts the diameter of the upper end of the seat tube to squeeze the outer tube 22. The height adjustment device 24 operatively connects the inner and outer tubes 20 and 22 together for selectively extending (raising) and retracting (lowering) the inner tube 20 with respect to the outer tube 22 based on a motor control signal from the operating switch 28 via the controller 26.

Figure 3:
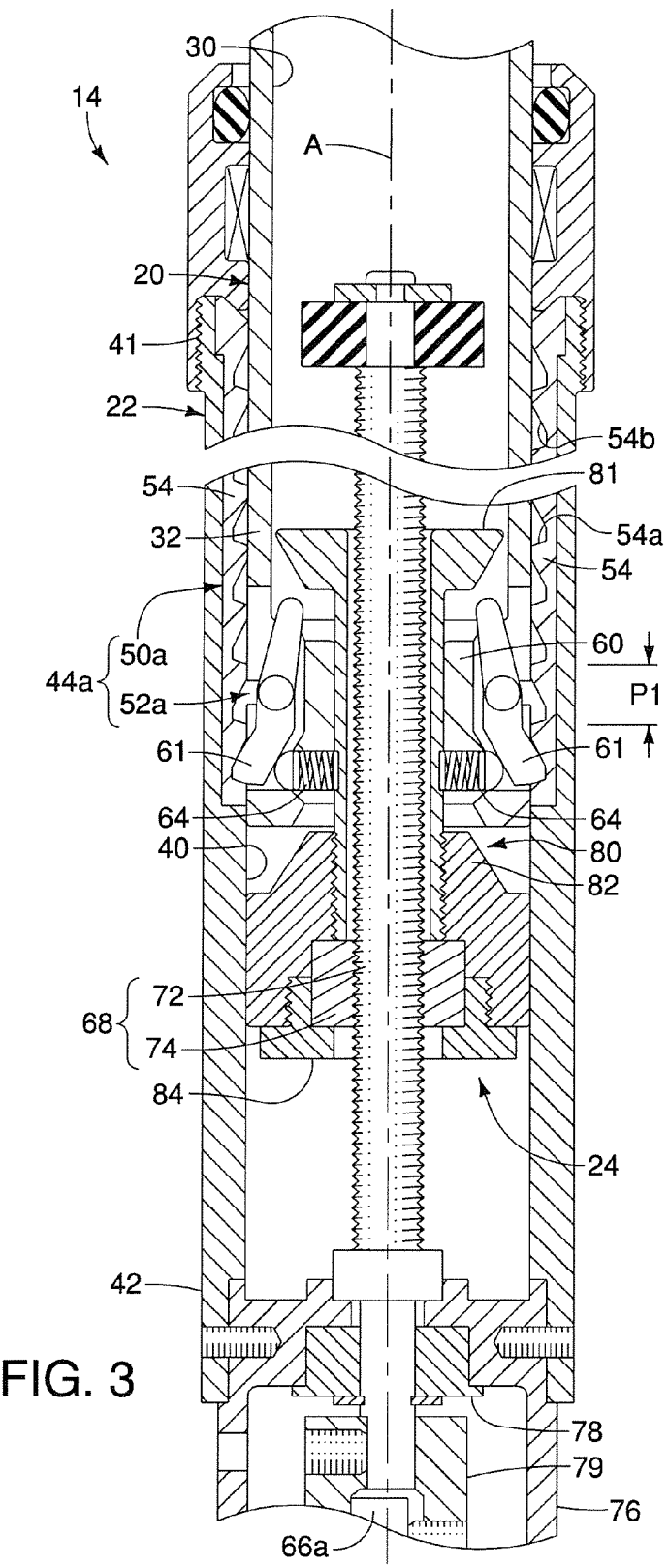
FIG. 3 is an enlarged longitudinal cross sectional view of a portion of the telescoping seatpost part as seen along section line 3-3 of FIG. 2.

As seen in FIGS. 1 to 3, the inner tube 20 has an interior bore 30, a first end 31 (FIG. 1) and a second end 32 (FIG. 3). The first end 31 of the inner tube 20 includes a seat mounting member 34 (FIG. 1) that secures the bicycle seat 13 thereto. The second end 32 of the inner tube 20 is open with the interior bore 30 of the inner tube 20 extending longitudinally from the opening of the second end 32 of the inner tube 20 to the first end 31 of the inner tube 20. As seen in FIG. 3, the second end 32 of the inner tube 20 has a portion of the height adjustment device 24 fixedly secured thereto as discussed below.

Figure 4:
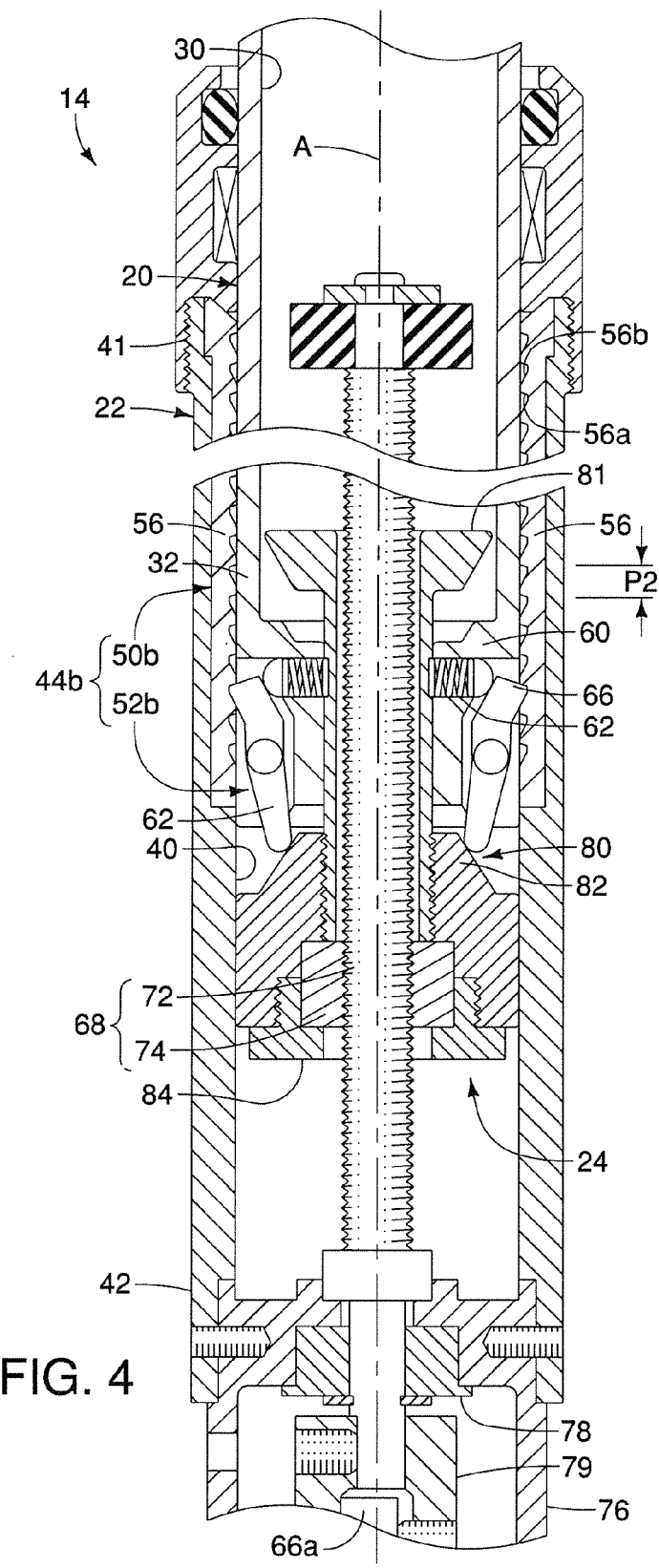
FIG. 4 is an enlarged longitudinal cross sectional view of a portion of the telescoping seatpost part as seen along section line 4-4 of FIG. 2.

As seen in FIGS. 3 and 4, the outer tube 22 has an interior bore 40, a first end 41 and a second end 42. The first and second ends 41 and 42 of the outer tube 22 are open with the interior bore 40 of the outer tube 22 extends longitudinally between the first and second ends 41 and 42 of the outer tube 22. The second end 32 of the inner tube 20 is telescopically disposed in the first end 41 of the outer tube 22. The second end 42 of the outer tube 22 has a portion of the height adjustment device 24 fixedly secured thereto as discussed below.

Referring now to FIGS. 3 and 4, the height adjustment device 24 will now be discussed in more detail. The height adjustment device 24 operatively coupled between the second end 32 of the inner tube 20 and the outer tube 22. In the illustrated embodiment, the height adjustment device 24 mainly includes a first ratchet arrangement 44a (FIG. 3), a second ratchet arrangement 44b (FIG. 4) and a drive source 46. As seen in FIG. 3, the first ratchet arrangement 44a includes a first ratchet tooth structure 50a and a first pawl structure 52a for selectively locking the inner tube 20 against upward axial movement with respect to the outer tube 22. As seen in FIG. 4, the second ratchet arrangement 44b includes a second ratchet tooth structure 50b and a second pawl structure 52b for selectively locking the inner tube 20 against downward axial movement with respect to the outer tube 22.

The first ratchet arrangement 44a is designed to lockout the drive source 46 such that when the rider sit down the seat 13, the downward force from the rider's weight is not transmitted to the drive source 46. In other words, when the first ratchet arrangement 44a is locked, as discussed below, the drive source 46 is unloaded with respect to a downward force being exerted on the seat 13 by the rider or other external force. In other words, the first ratchet arrangement 44a constitutes a lockout mechanism that can support a rider's weight so that the rider's weight is not transmitted to the drive source 46 of the height adjustment device 24 once the height of the seat 13 is set to a desired seat position for the rider.

The first pawl structure 52a is movably arranged to move between a lock position and a movable position with respect to the first ratchet tooth structure 50a. The first pawl structure 52a is engaged with the first ratchet tooth structure 50a in the lock position. In the second end 32 of the inner tube 20 being disposed inside the first end 41 of the outer tube 22, the first pawl structure 52a is mounted to the inner tube 20 and the first ratchet tooth structure 50a mounted to an interior surface of the outer tube 22. As explained below, the first pawl structure 52a is movably coupled with respect to the first ratchet tooth structure 50a in the movable position such that the inner and outer tubes 20 and 22 are movably arranged relative to each other in at least one axial direction of the inner and outer tubes 20 and 22.

As seen in FIG. 3, the first ratchet tooth structure 50a of the first ratchet arrangement 44a includes a set of first ratchet teeth 54 having a first prescribed pitch P1. Each of the first ratchet teeth 54 corresponds to a preset seatpost positions. In other words, the total number of the first ratchet teeth 54 corresponds to a total number of preset seatpost positions that are available to the rider. However, as seen in FIG. 4, the second ratchet tooth structure 50b of the second ratchet arrangement 44b includes a set of second ratchet teeth 56 having a second prescribed pitch P2. The second prescribed pitch P2 is smaller than the first prescribed pitch P1. The second prescribed pitch P2 is equal to the first prescribed pitch P1 divided by an integral number greater than 1 (i.e., 2, 3, 4 . . . ). In the illustrated embodiment, the second prescribed pitch P2 is equal to one-half of the first prescribed pitch P1 (e.g., P1=4.5 mm to 5.0 mm and P2=2.25 mm to 2.5 mm). However, the second pitch P2 is not limited to being equal to one-half of the first pitch P1.

The first and second ratchet teeth 54 and 56 are formed on the interior surface of the outer tube 22. In the illustrated embodiment, the first ratchet teeth 54 are formed as a first pair of rack inserts that are spaced 180° apart and disposed in linear recesses in the interior surface of the outer tube 22. Similarly, the second ratchet teeth 56 are formed as a second pair of rack inserts that are spaced 180° apart and disposed in linear recesses in the interior surface of the outer tube 22. While the first and second ratchet teeth 54 and 56 are preferably linear ratchet teeth as illustrated, it is not necessary that the ratchet teeth be linearly arranged on the interior surface of the outer tube 22. Other arrangements of the first and second ratchet teeth 54 and 56 are possible. For example it is possible for the ratchet teeth to be spirally arranged on the interior surface of the outer tube 22.

The first ratchet teeth 54 have a pawl abutment 54a that selectively engages the first pawl structure 52a in the lock position to prevent axial retraction of the inner and outer tubes 20 and 22. The second ratchet teeth 56 have a pawl abutment 56a that selectively engages the first pawl structure 52a in the lock position to prevent axial expansion of the inner and outer tubes 20 and 22. Each of the pawl abutments 56a corresponds to a predetermined seat position for the seat 13.

Figure 5:
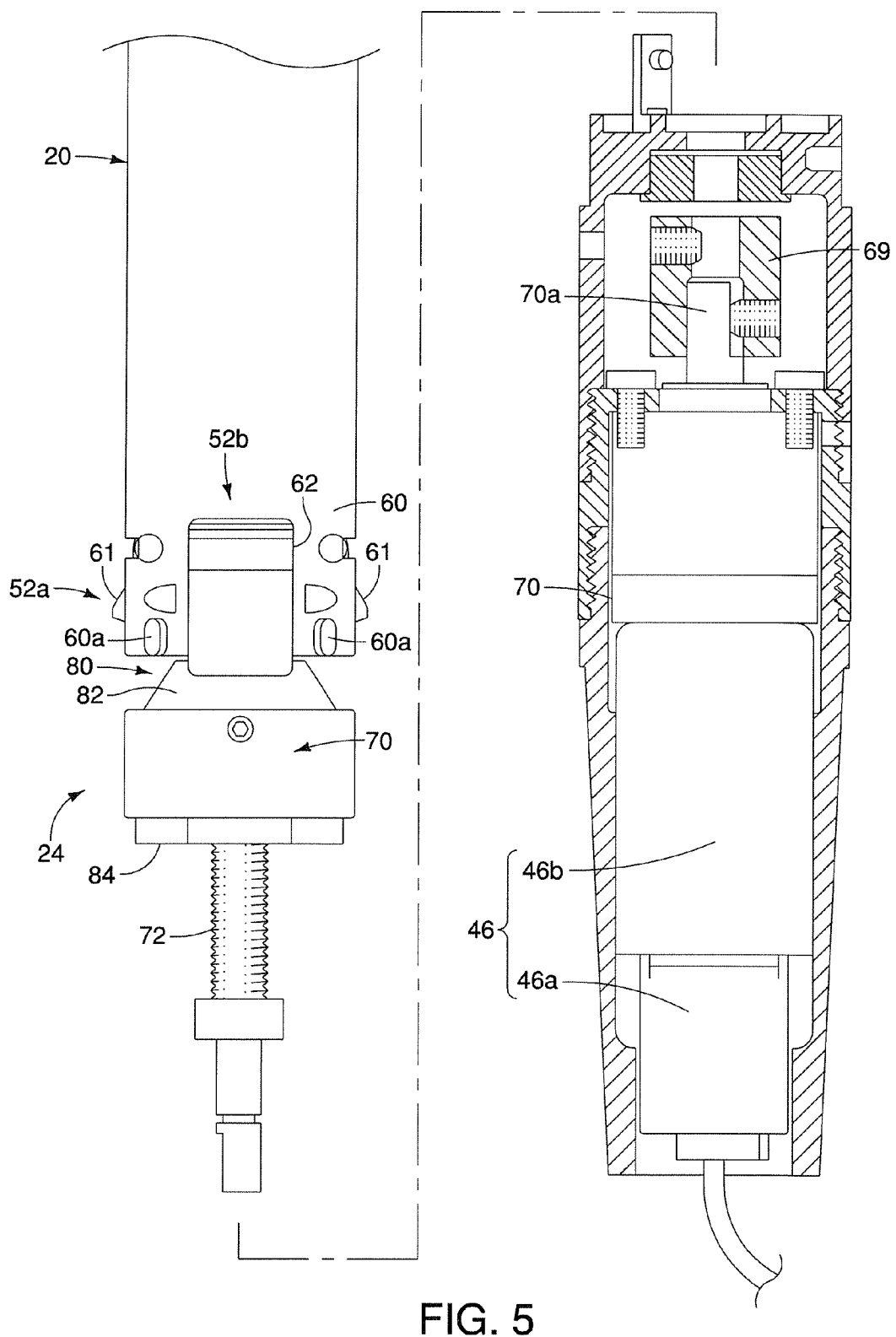
FIG. 5 is an exploded elevational view of selected parts of the telescoping seatpost part of the height adjustable seatpost assembly.

As seen in FIGS. 3 to 5, the first and second pawl structures 52a and 52b are mounted on a connection structure or pawl holder 60. In the illustrated embodiment, the first pawl structure 52a includes a pair of first stop pawl members 61 pivotally mounted to the pawl holder 60, while the second pawl structure 52b includes a pair of second stop pawl members 62. While two of the first stop pawl members 61 and two of the second stop pawl members 62 are used in the illustrated embodiment, it is acceptable to use only one first stop pawl member and only one second stop pawl if needed and/or desired.

The pawl holder 60 is fixed to the second end 32 of the inner tube 20 with the first and second stop pawl members 61 and 62 pivotally mounted to the pawl holder 60 for movement into and out of engagement with the first and second ratchet teeth 54 and 56 as discussed below. While the pawl holder 60 is illustrated are being integrally formed with the second end 32 of the inner tube 20, it is preferably to have the pawl holder 60 attached to the second end 32 of the inner tube 20 in a releasable manner such as by a screw connection (not shown). As seen in FIG. 5, the outer surface of the pawl holder 60 has a plurality of anti-rotation projections or keys 60a that slidably engage longitudinally extending slots (not shown) formed on the interior bore 40 of the outer tube 22 for preventing relative rotation of the inner and outer tubes 20 and 22.

The first stop pawl members 61 are configured and arranged to prevent downward movement of the inner tube 20 with respect to the outer tube 22 as seen in FIG. 3, while the second stop pawl members 62 are configured and arranged to prevent upward movement of the inner tube 20 with respect to the outer tube 22 as seen in FIG. 4.

Figure 6:
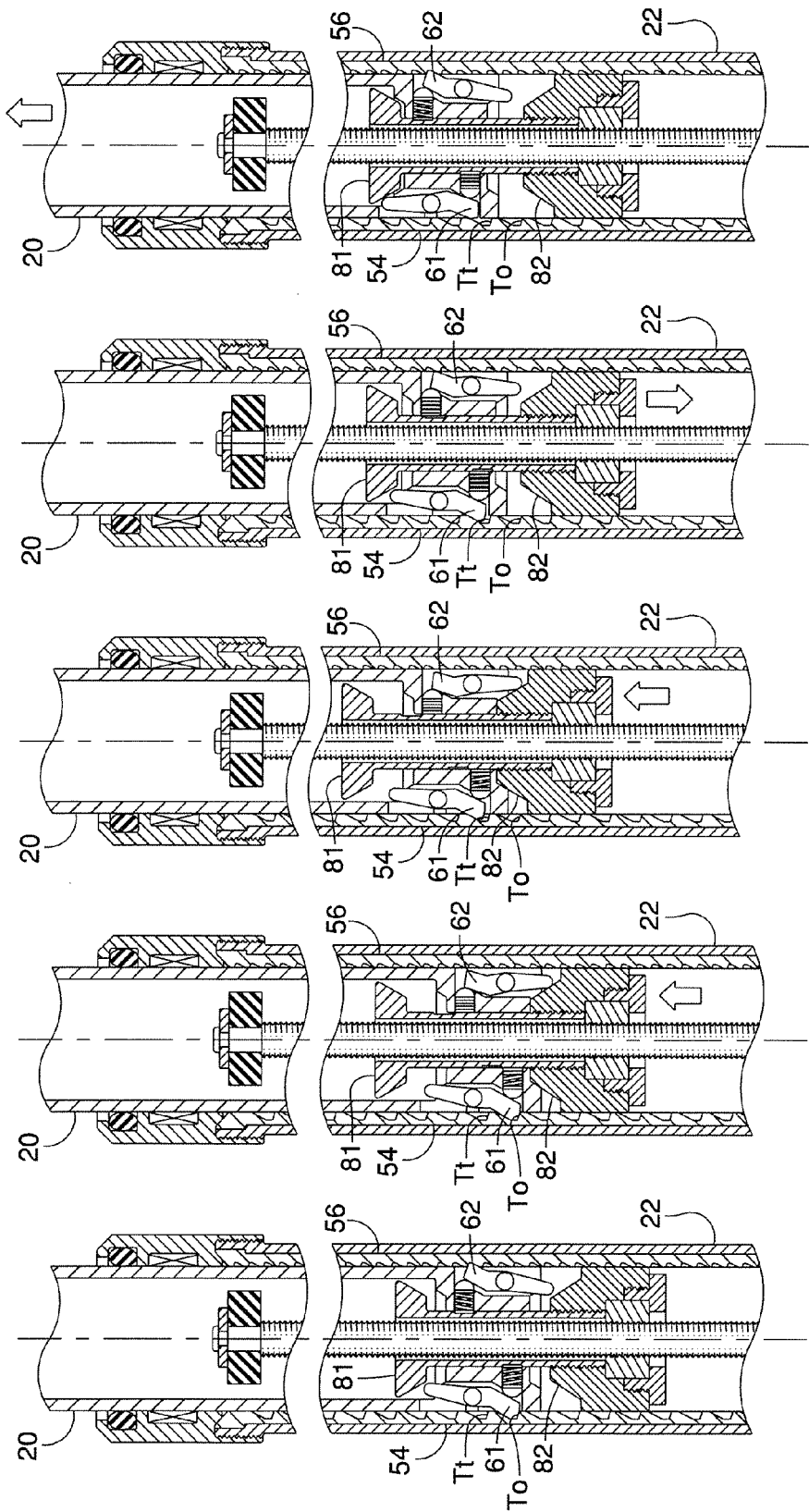
FIG. 6 is a series of longitudinal cross sectional views of a portion of the telescoping seatpost part as seen along section line 3-A-4 of FIG. 2 showing an expansion operation of the inner (upper) tube with respect to the outer (lower) tube, with the left half of the cross section of the telescoping seatpost part corresponding to the cross section illustrated in FIG. 3 and the right half of the cross section of the telescoping seatpost part corresponding to the cross section illustrated in FIG. 4.

FIG. 6 a series of longitudinal cross sectional views of a portion of the telescoping seatpost part as seen along section line 3-A-4 of FIG. 2 showing an expansion operation of the inner tube 20 with respect to the outer tube 22. Enlargements of the views in FIG. 6 are shown in FIGS. 7 to 11. In these FIGS. 6 to 11, the first stop pawl members 61 are initially engaged with a current or original tooth To of the first ratchet teeth 54 and the drive source 46 of the height adjustment device 24 is being drive so that the first stop pawl members 61 will in engage a target tooth Tt of the first ratchet teeth 54. For the sake of simplicity the original tooth To and the target tooth Tt are adjacent of ones the first ratchet teeth 54. However, the original tooth To and the target tooth Tt can be separated one or more of the first ratchet teeth 54 depending on the desired adjustment.

Figure 7:
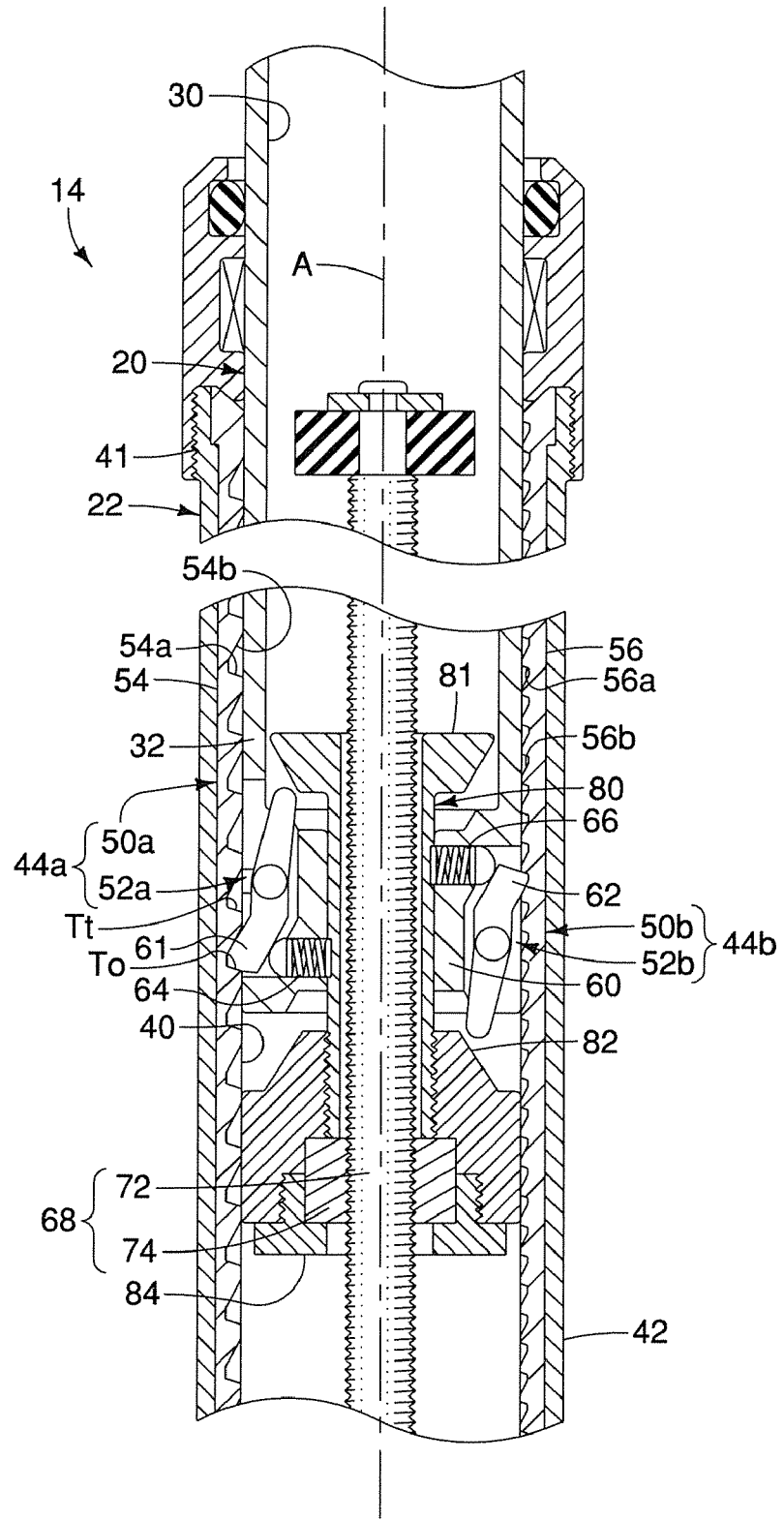
FIG. 7 is a longitudinal cross sectional view of a portion of the telescoping seatpost part corresponding to the first drawing of FIG. 6 showing a starting seat position of the expansion operation illustrated in FIG. 6.
Figure 8:
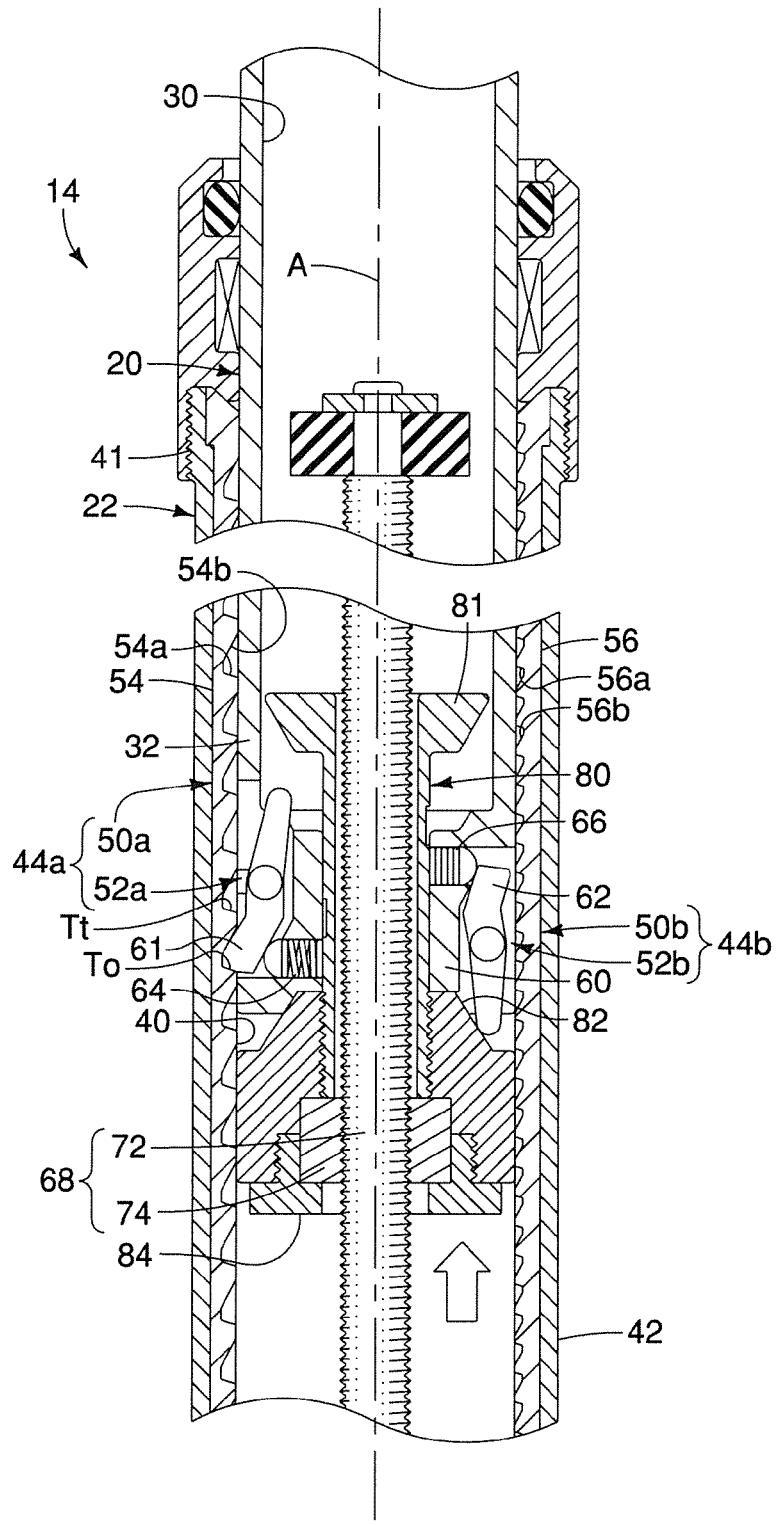
FIG. 8 is a longitudinal cross sectional view of a portion of the telescoping seatpost part corresponding to the second drawing of FIG. 6 showing the screw nut and the pawl release structure moving upward from the position in FIG. 7 such that the lower cam portion of the pawl release structure contacts the upward movement stop pawl members to move them completely out of engagement from the teeth of the ratchet tooth structure.
Figure 12:
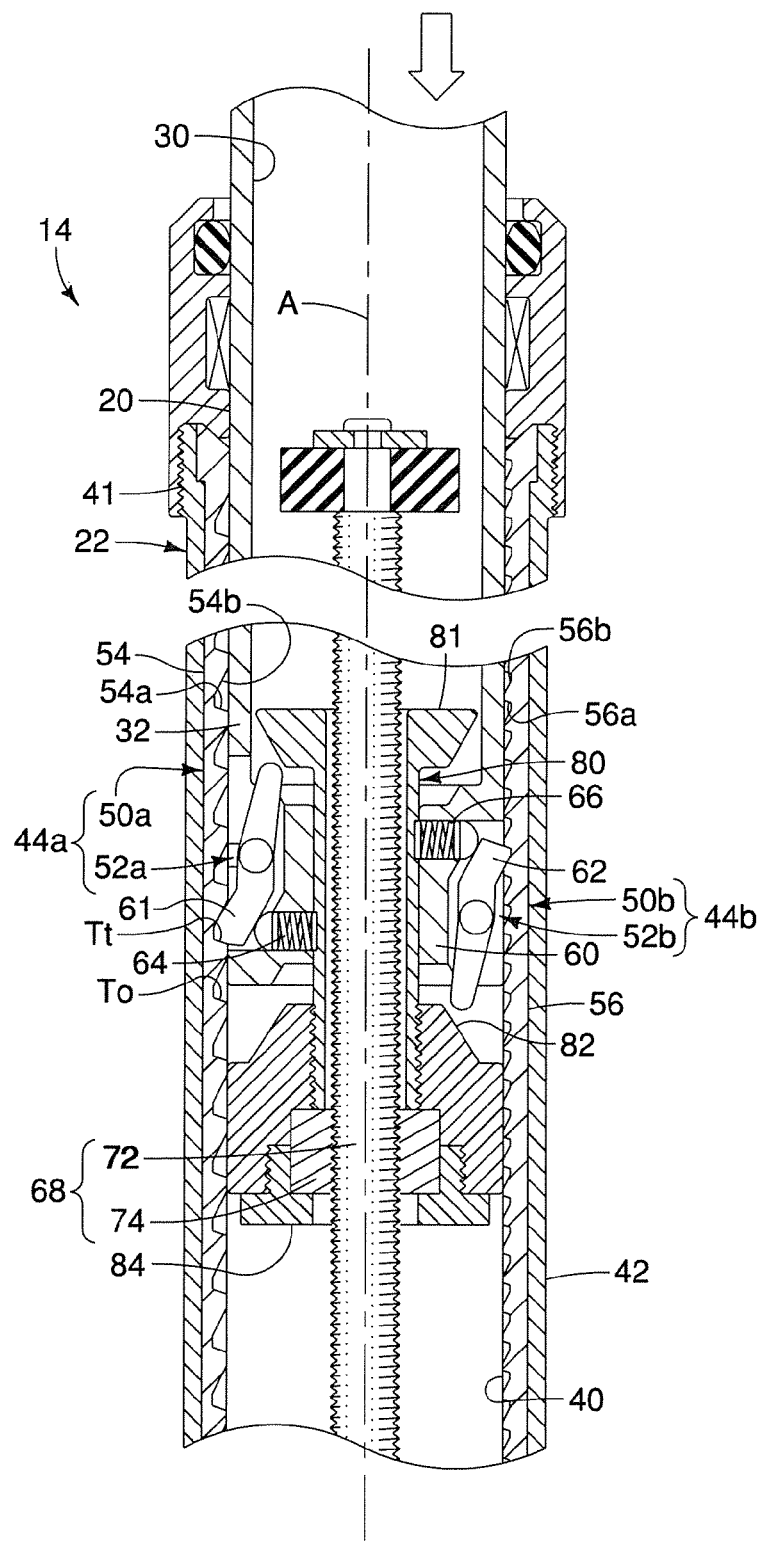
FIG. 12 is a longitudinal cross sectional view of a portion of the telescoping seatpost part showing a situation in which a downward force was applied to the inner (upper) tube from the position of FIG. 10 or 11 such that the downward and upward movement stop pawl members are fully seated in their locked positions.
Figure 13:
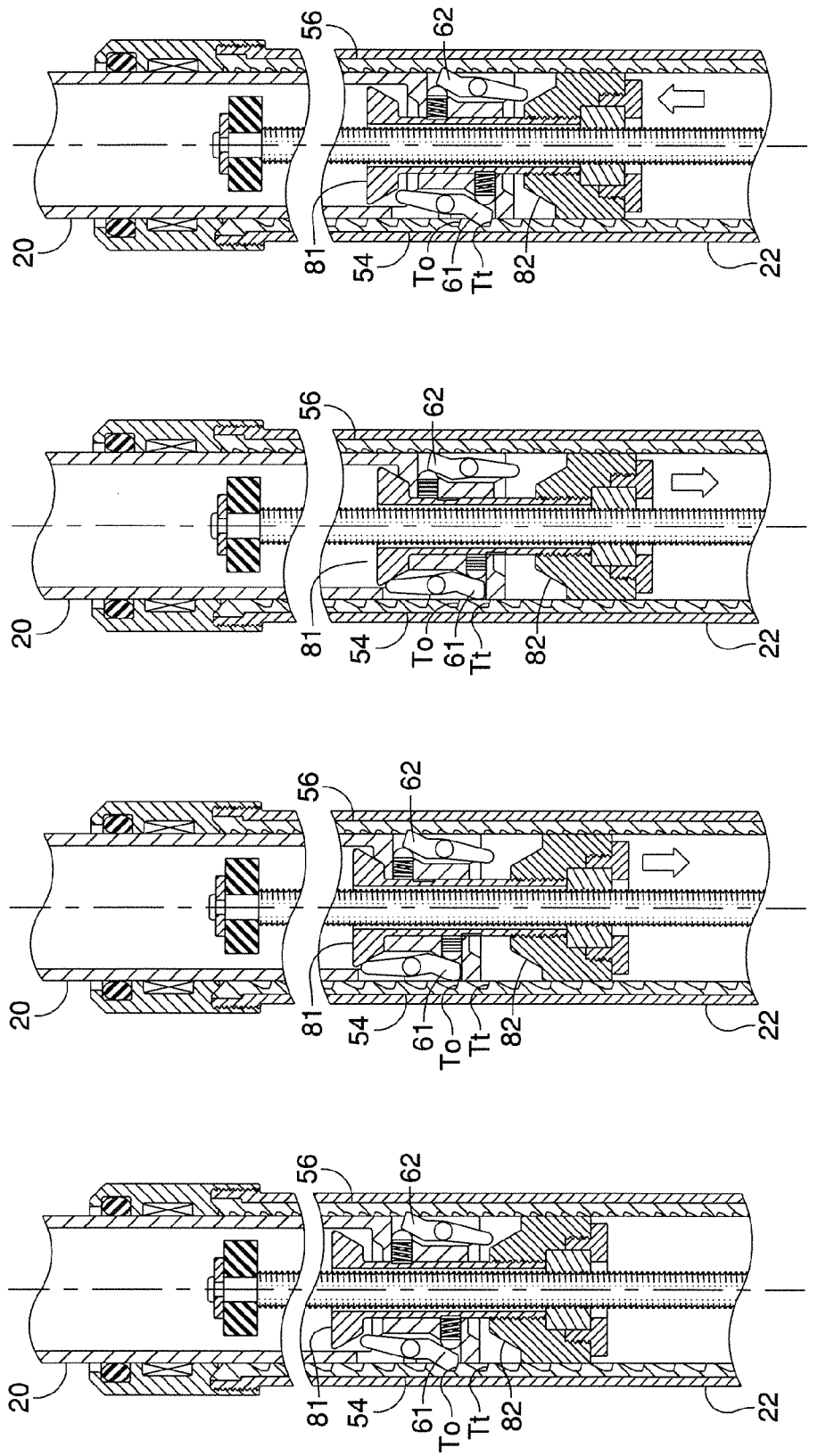
FIG. 13 is a series of longitudinal cross sectional views of a portion of the telescoping seatpost part as seen along section line 3-A-4 of FIG. 2 showing a retraction operation of the inner (upper) tube with respect to the outer (lower) tube, with the left half of the cross section of the telescoping seatpost part corresponding to the cross section illustrated in FIG. 3 and the right half of the cross section of the telescoping seatpost part corresponding to the cross section illustrated in FIG. 4.
Figure 14:
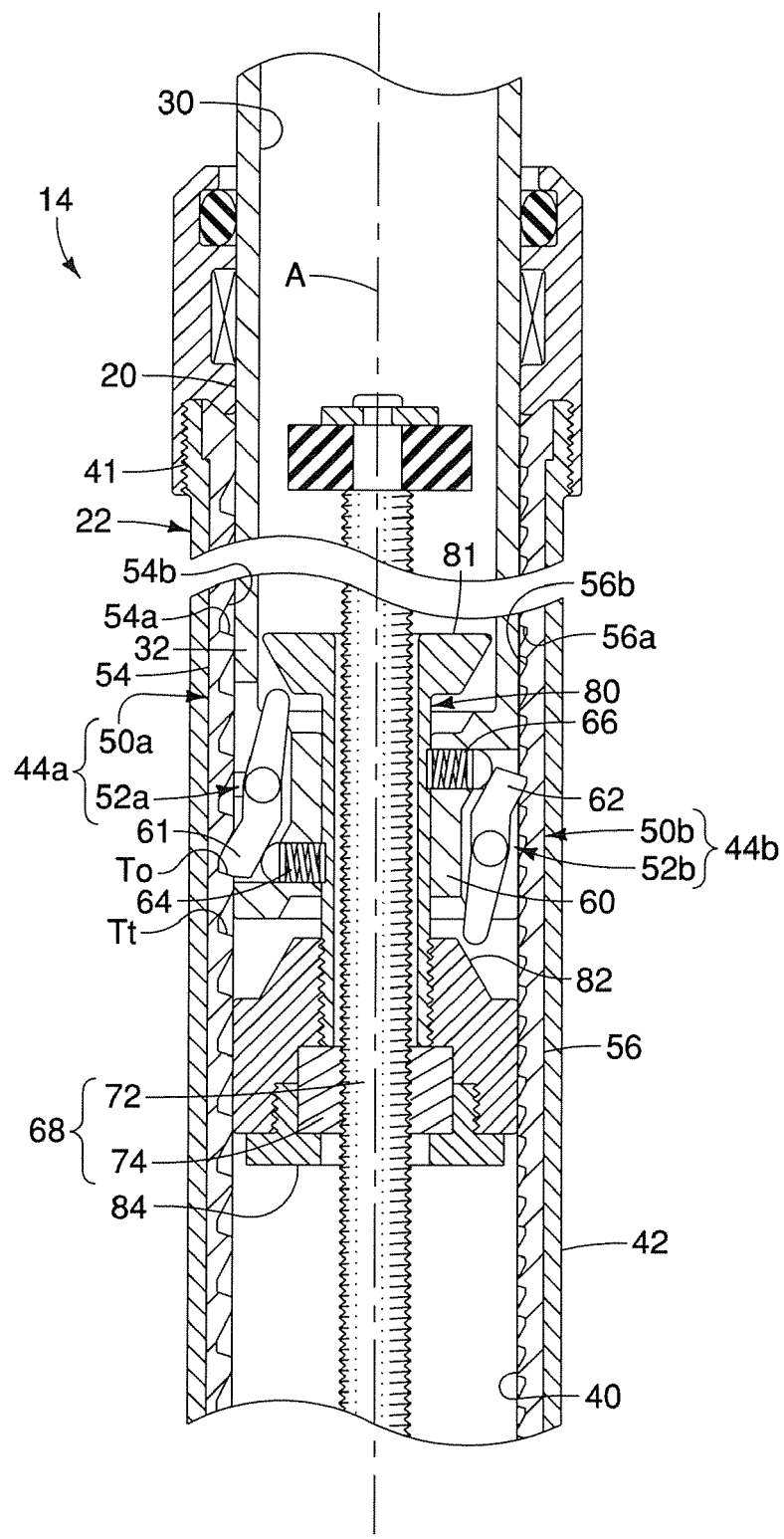
FIG. 14 is a longitudinal cross sectional view of a portion of the telescoping seatpost part corresponding to the first drawing of FIG. 13 showing a starting seat position of the retraction operation illustrated in FIG. 13.
Figure 15:
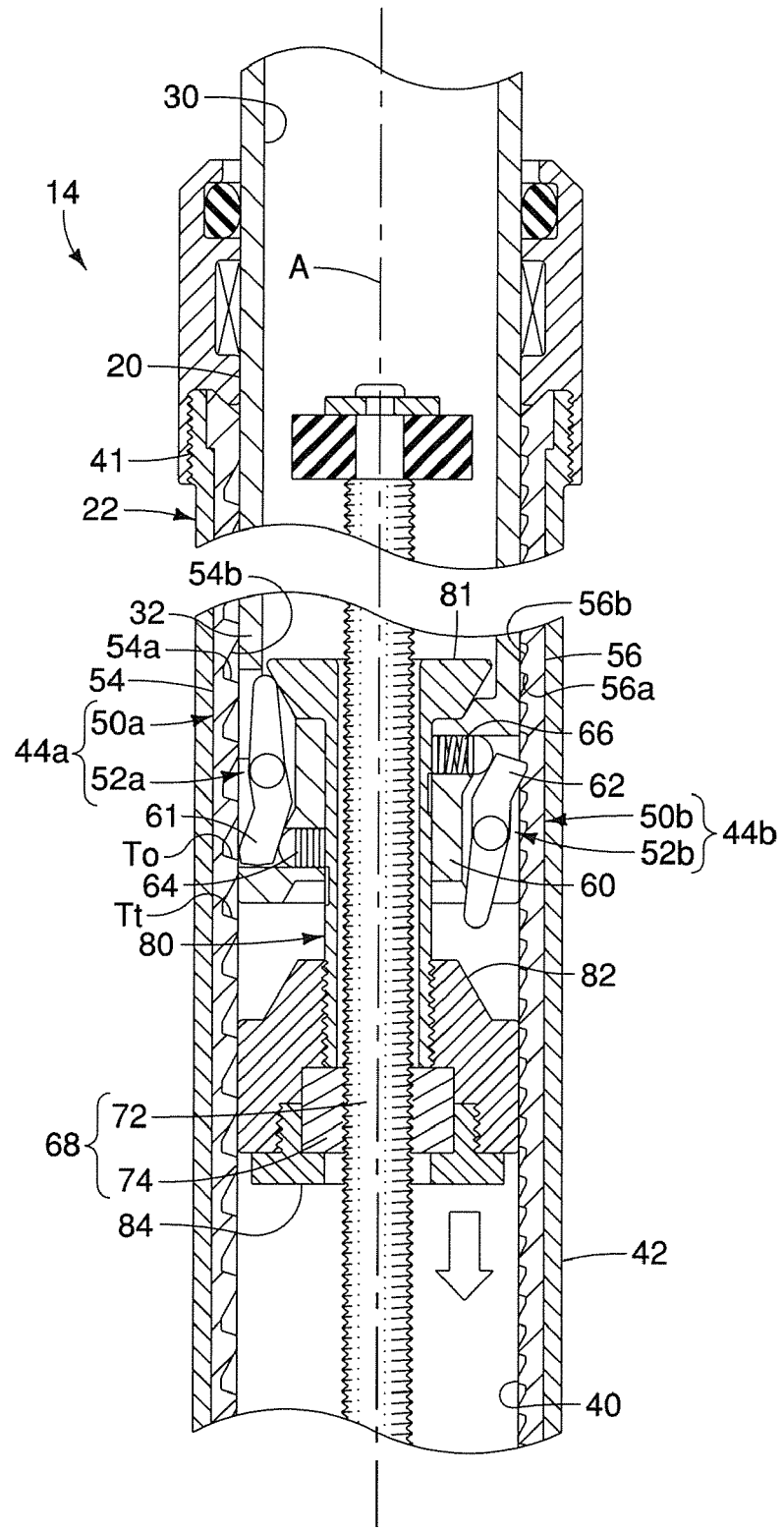
FIG. 15 is a longitudinal cross sectional view of a portion of the telescoping seatpost part corresponding to the second drawing of FIG. 13 showing the screw nut and the pawl release structure moving downward from the position in FIG. 14 such that the downward movement stop pawl members are moved completely out of engagement from the teeth of the ratchet tooth structure by the upper cam portion before moving the inner (upper) tube relative to the outer (lower) tube.
Figure 16:
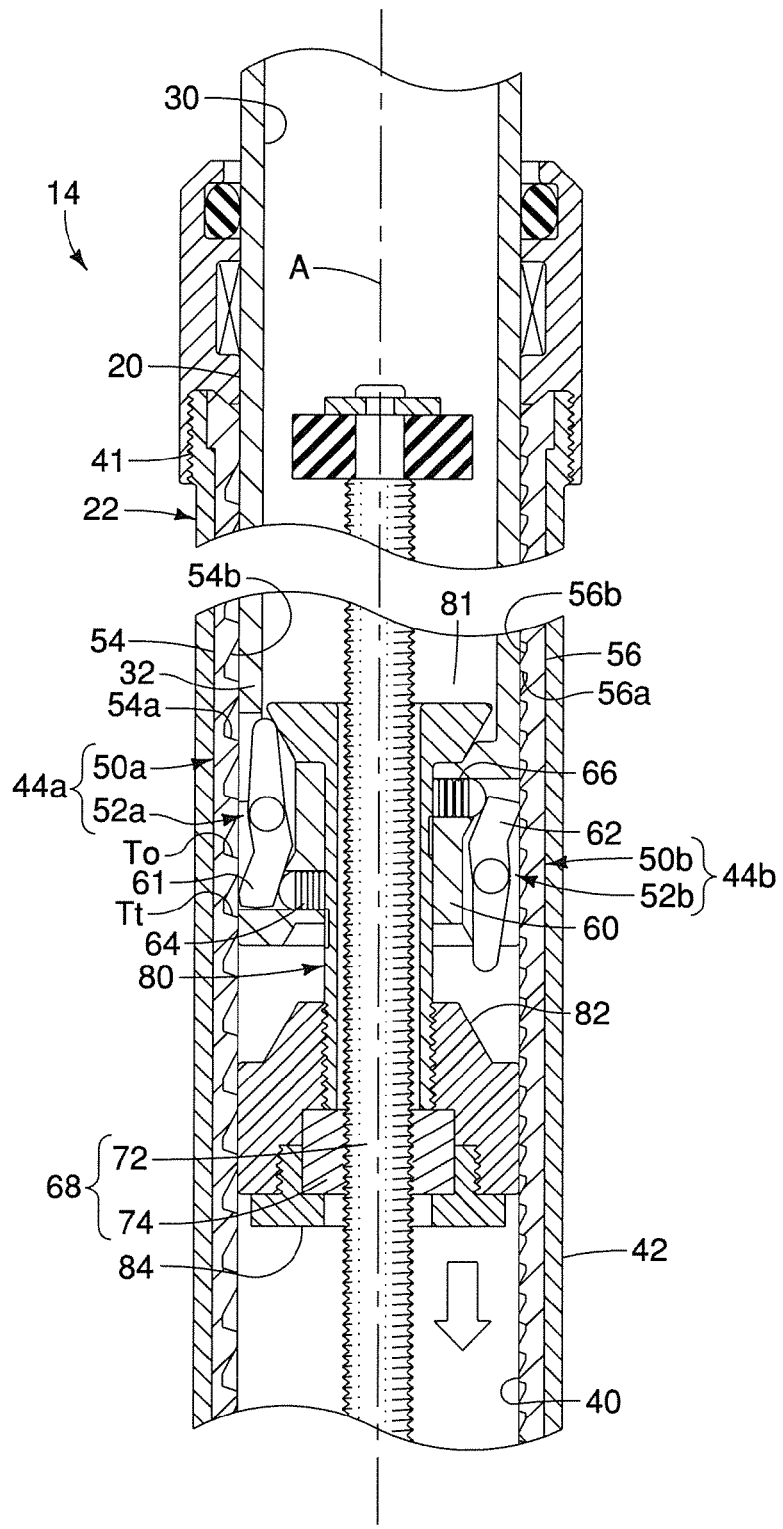
FIG. 16 is a longitudinal cross sectional view of a portion of the telescoping seatpost part corresponding to the third drawing of FIG. 13 showing the inner (upper) tube moved downward relative to the outer (lower) tube from the position in FIG. 15 such that the upper cam portion starts separating from the downward movement stop pawl members with the upward movement stop pawl members contacting an area between two of the ratchet teeth.
Figure 17:
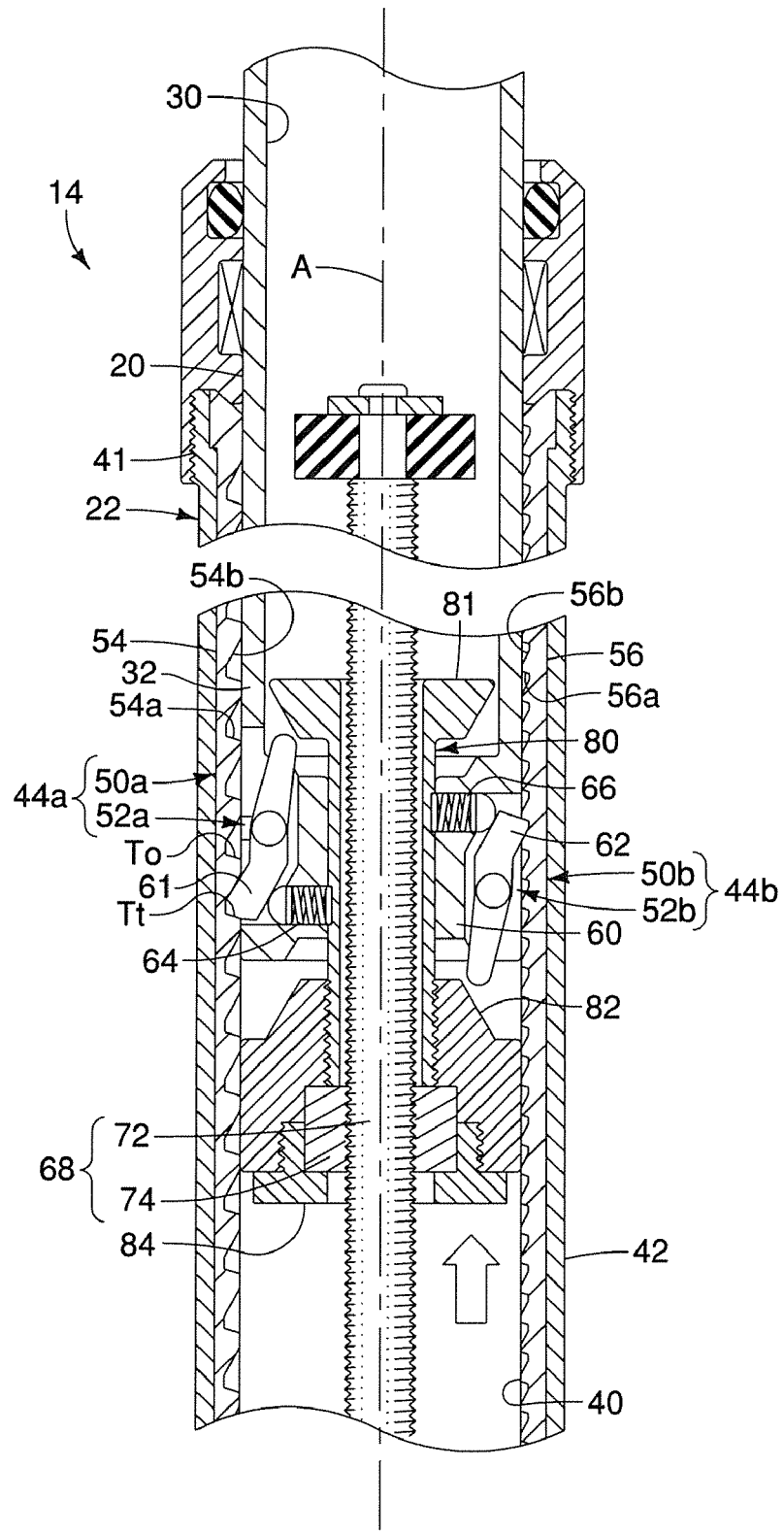
FIG. 17 is a longitudinal cross sectional view of a portion of the telescoping seatpost part corresponding to the last (fourth) drawing of FIG. 13 showing an ending seat position of the retraction operation illustrated in FIG. 13 in which the downward and upward movement stop pawl members lock the inner (upper) tube to the outer (lower) tube in the desired or preset position.

When the seat 13 is locked in the seat position as seen in FIGS. 7 and 12, the first stop pawl members 61 are fully engaged with the first ratchet teeth 54 and the second stop pawl members 62 are fully engaged with the second ratchet teeth 56. Thus, the inner and outer tubes 20 and 24 cannot move relative to each other in the longitudinal direction. Also, when the seat 13 is in one of the preset seat positions, a downward force on the inner tube 20 will not be transmitted to the drive source 46 due to the engagement of the first stop pawl members 61 with the first ratchet teeth 54.

Figure 9:
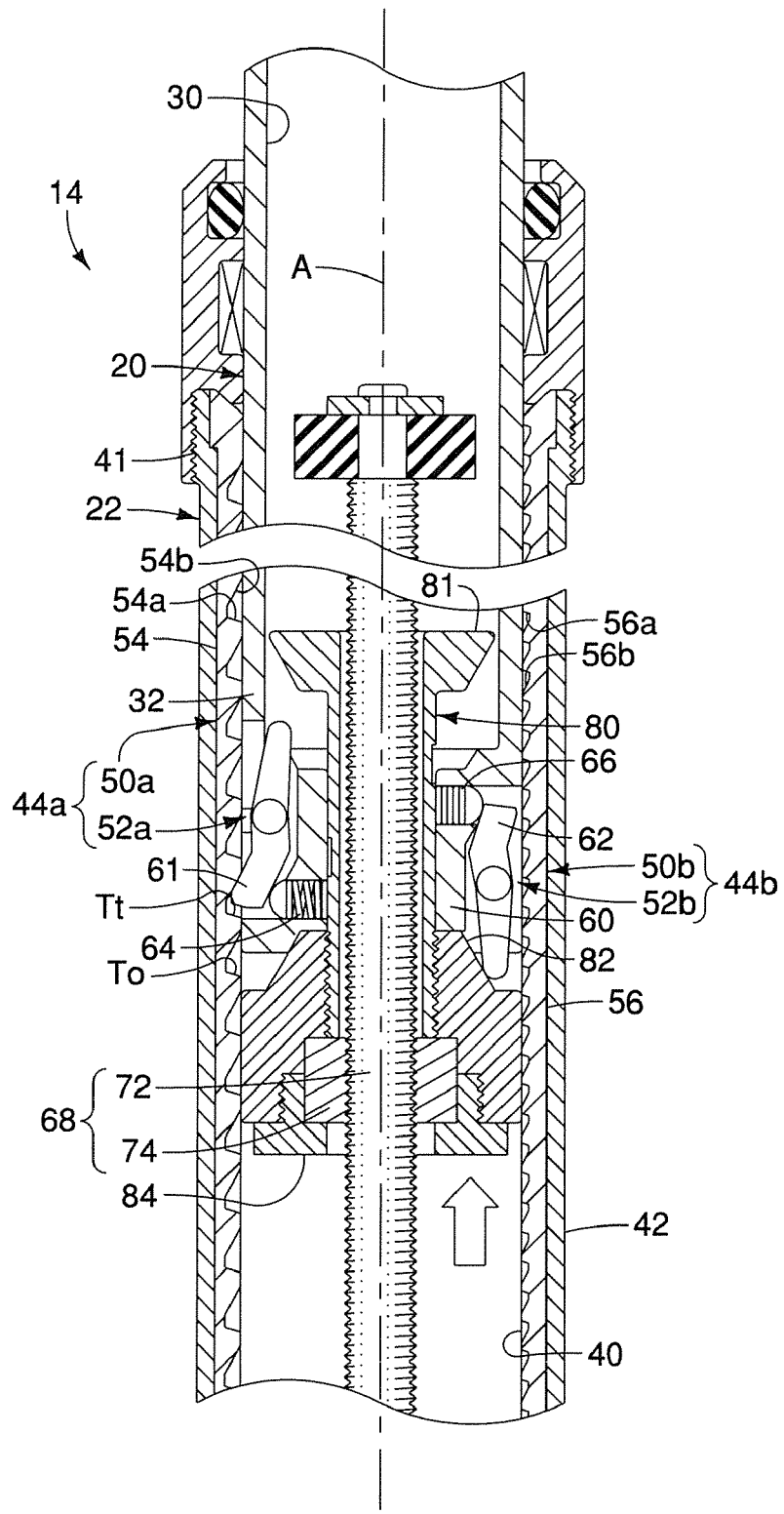
FIG. 9 is a longitudinal cross sectional view of a portion of the telescoping seatpost part corresponding to the third drawing of FIG. 6 showing the screw nut and the pawl release structure moving farther upward from the position in FIG. 8 to slightly higher position than the preset or desired seat position such that the lower cam portion moves the pawl holder and the inner (upper) tube upward as a unit relative to the outer (lower) tube and such that the downward movement stop pawl members at the next higher tooth of the ratchet tooth structure.
Figure 10:
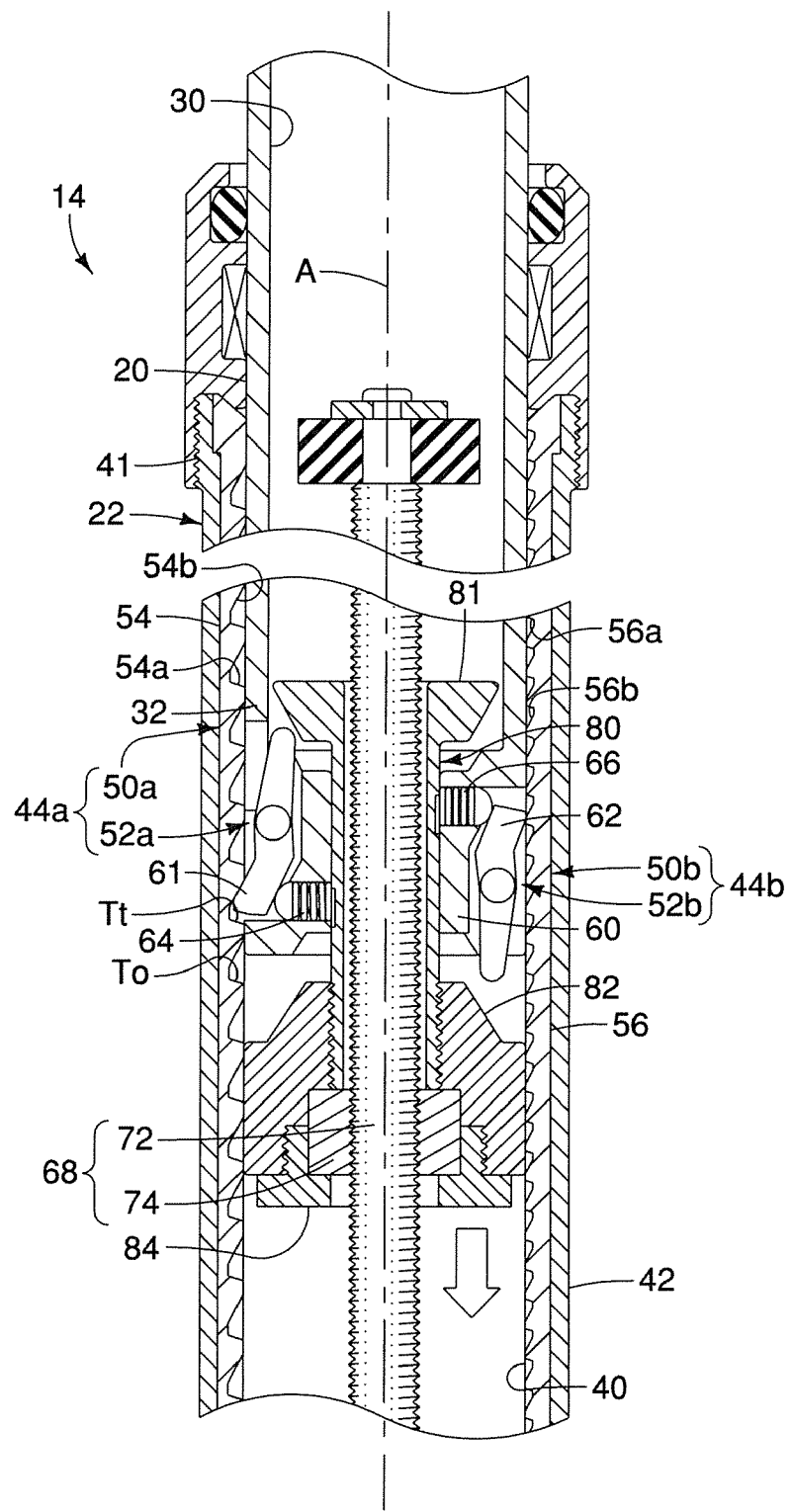
FIG. 10 is a longitudinal cross sectional view of a portion of the telescoping seatpost part corresponding to the fourth drawing of FIG. 6 showing the screw nut and the pawl release structure moving downward so that the downward movement stop pawl members contacts the ratchet tooth structure at a position where they are not fully seated in their locked positions.
Figure 11:
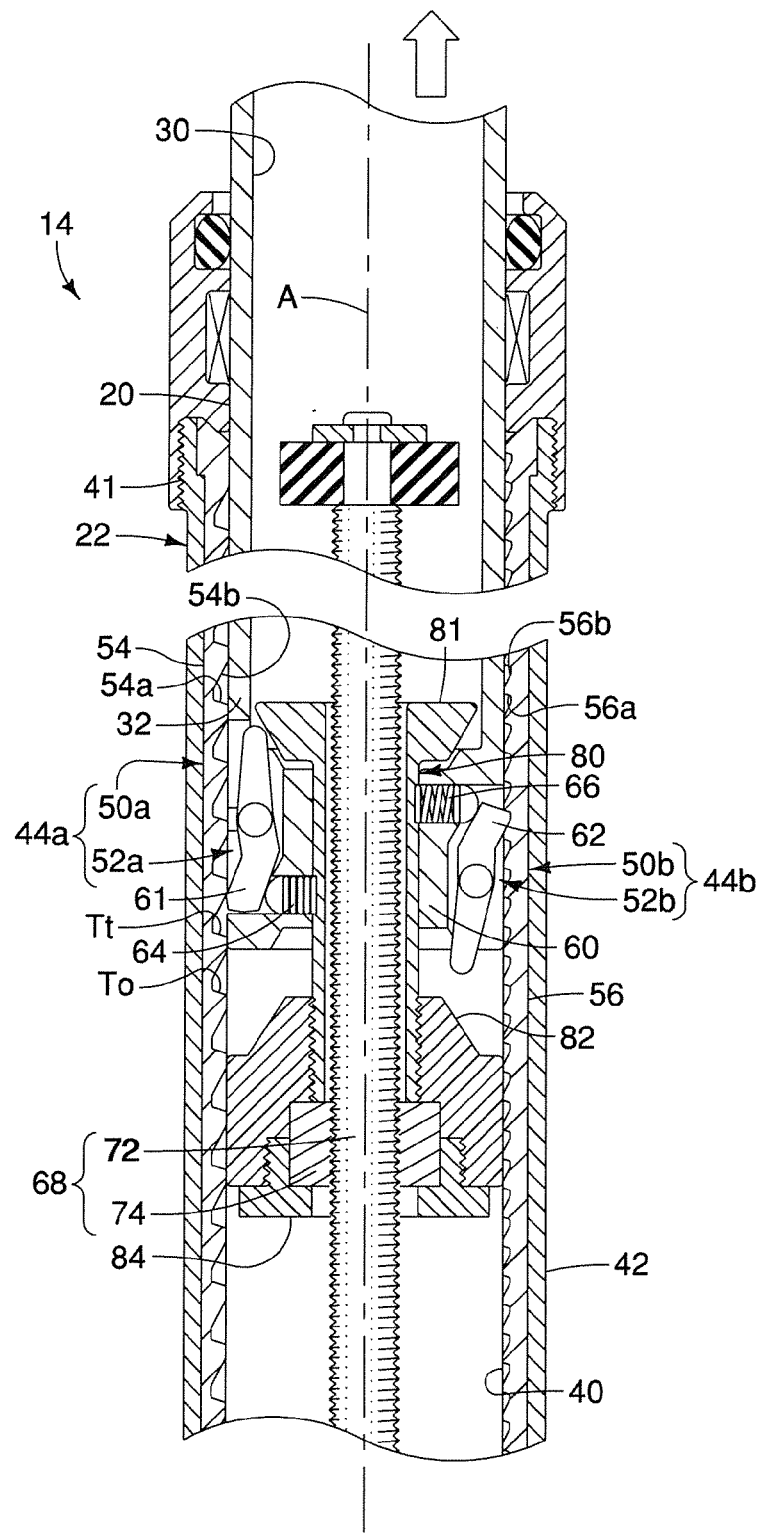
FIG. 11 is a longitudinal cross sectional view of a portion of the telescoping seatpost part corresponding to the last (fifth) drawing of FIG. 6 showing the ending seat position of the expansion operation illustrated in FIG. 6 but where the inner (upper) tube is subjected to an upward force such that the upward movement stop pawl members lock the inner (upper) tube from moving too far upward.

However, in some circumstances, the first and second stop pawl members 61 and 62 may not fully engage the first and second ratchet teeth 54 and 56 for example as seen in FIGS. 9 and 10. In particular, if the first and second stop pawl members 61 and 62 are not fully engaged with the first and second ratchet teeth 54 and 56 while an upward force is applied to the inner tube 20 as seen in FIG. 11, then the second stop pawl member 62 will fully engage the second ratchet teeth 56 to minimize the upward force movement of the inner tube 20. Since the second pitch P2 of the second ratchet teeth 56 is smaller than the first pitch P1 of the first ratchet teeth 54, the first stop pawl members 61 will be prevented from engaging the next higher one of the pawl abutments 54a as seen in FIG. 11.

As seen in FIGS. 6 to 11, an expansion operation (i.e., raising the inner tube 20 with respect to the outer tube 22) of the telescoping seatpost part 14 is illustrated. While the expansion operation illustrated in FIGS. 6 to 11 shows only the inner tube 20 being raised by the first prescribed pitch P1 (e.g., 4.5 mm to 5.0 mm) between two adjacent ones of the pawl abutments 54a. Typically, an expansion operation will raise the inner tube 20 by a distance corresponding to several of the pawl abutments 54a of the first ratchet teeth 54. During an expansion operation of the telescoping seatpost part 14, the first stop pawl members 61 are ratcheted upward against the first ratchet teeth 54, while the second stop pawl members 62 are held out of engagement from the second ratchet teeth 56 as discussed below.

As seen in FIGS. 6 to 11, the first stop pawl members 61 are movably arranged with respect to the first ratchet teeth 54 between first lock positions and first free positions with respect to the first ratchet teeth 54 in response to a drive operation of the drive source 46. In the case of a retraction operation (i.e., lowering the inner tube 20 with respect to the outer tube 22) of the telescoping seatpost part 14, the first stop pawl members 61 are moved from the first lock positions to the first free positions with respect to the first ratchet teeth 54 in response to a first drive operation of the drive source 46. The first stop pawl members 61 are biased towards the first lock positions by biasing elements 64. Each of the first stop pawl members 61 contacts one of the pawl abutments 54a of the first ratchet teeth 54 in the first lock position to prevent downward movement of the inner tube 20 with respect to the outer tube 22 as seen in FIG. 3.

Due to the shape of cam surfaces 54b of the first ratchet teeth 54, the inner tube 20 can move upward with respect to the outer tube 22 with a ratcheting action occurring between the first stop pawl members 61 and the first ratchet teeth 54 during upward movement of the inner tube 20 with respect to the outer tube 22. More specifically, initially during upward movement of the inner tube 20 with respect to the outer tube 22, the cam surfaces 54b of the first ratchet teeth 54 push the first stop pawl members 61 radially inward against the biasing forces of the biasing elements 64 until the first stop pawl members 61 exit the current teeth of the first ratchet teeth 54. Then with further upward movement of the inner tube 20 with respect to the outer tube 22, the biasing forces of the biasing elements 64 move the first stop pawl members 61 radially outward into the next teeth of the first ratchet teeth 54. This ratcheting action of the first stop pawl members 61 with the first ratchet teeth 54 continues until the first stop pawl members 61 reach the desired position. Thus, upon the first stop pawl members 61 reaching the desired position, the first stop pawl members 61 engage the first ratchet teeth 54 in the first lock positions to prevent contraction of the inner and outer tubes 20 and 22, and the second stop pawl members 62 engage the second ratchet teeth 56 in the second lock positions to prevent expansion of the inner and outer tubes 20 and 22.

As seen in FIGS. 13 to 17, a retraction operation (i.e., lowering the inner tube 20 with respect to the outer tube 22) of the telescoping seatpost part 14 is illustrated. While the retraction operation illustrated in FIGS. 14 to 18 shows only the inner tube 20 being lowered by the first prescribed pitch P1 (e.g., 4.5 mm to 5.0 mm) between two adjacent ones of the pawl abutments 54a. Typically, a retraction operation lowers the inner tube 20 by a distance corresponding to several of the pawl abutments 54a of the first ratchet teeth 54. During a retraction operation of the telescoping seatpost part 14, the second stop pawl members 62 are ratcheted downward against the second ratchet teeth 56, while the first stop pawl members 61 are held out of engagement from the first ratchet teeth 54 as discussed below.

As seen in FIGS. 13 to 17, the second stop pawl members 62 are movably arranged between second lock positions and second free positions with respect to the second ratchet teeth 56 in response to a drive operation of the drive source 46 in an axial direction with respect to the inner and outer tubes 20 and 22. In the case of an expansion operation (i.e., raising the inner tube 20 with respect to the outer tube 22) of the telescoping seatpost part 14, the second stop pawl members 62 are moved from the second lock positions and the second free positions with respect to the second ratchet teeth 56 in response to a second drive operation of the drive source 46 in a second (upward) axial direction with respect to the inner and outer tubes 20 and 22. The second stop pawl members 62 are biased towards the second lock positions by biasing elements 66. Each of the second stop pawl members 62 contacts one of the pawl abutments 56a of the second ratchet teeth 56 in the second lock position to prevent upward movement of the inner tube 20 with respect to the outer tube 22 as seen in FIG. 4.

Due to the shape of cam surfaces 56b of the second ratchet teeth 56, the inner tube 20 can move downward with respect to the outer tube 22 with a ratcheting action occurring between the second stop pawl members 62 and the second ratchet teeth 56 during downward movement of the inner tube 20 with respect to the outer tube 22. More specifically, initially during downward movement of the inner tube 20 with respect to the outer tube 22, the cam surfaces 56b of the second ratchet teeth 56 push the second stop pawl members 62 radially inward against the biasing forces of the biasing elements 66 until the second stop pawl members 62 exit the current teeth of the second ratchet teeth 56. Then with further downward movement of the inner tube 20 with respect to the outer tube 22, the biasing forces of the biasing elements 66 move the second stop pawl members 62 radially outward into the next teeth of the second ratchet teeth 56. This ratcheting action of the second stop pawl members 62 with the second ratchet teeth 56 continues until the second stop pawl members 62 reach the desired position.

Now the drive source 46 will be discussed in more detail. The drive source 46 is operatively connected to the first and second pawl structures 52a and 52b to selectively move the first and second pawl structures 52a and 52b between their lock positions and their free positions in response to operation of the drive source 46. More specifically, the drive source 46 is operatively connected between the inner and outer tubes 20 and 22 through the first pawl structure 52a of the first ratchet arrangement 44a to axially move the inner and outer tubes 20 and 22 relative to each other in response to operation of the drive source 46. In the illustrated embodiment, as seen in FIG. 5, the drive source 46 is provided with a rotary encoder 46a and a reversible electric motor 46b. The electric motor 46 is mechanically coupled to a linear movement mechanism 68 via a gear reduction unit 70.

In this illustrated embodiment, the linear movement mechanism 68 is mainly formed by a drive screw 72 and a screw nut 74. The screw nut 74 is threadedly engaged with the drive screw 72 such that the screw nut 74 moves in an axial direction of the drive screw 72 in response to relative rotational movement between the drive screw 72 and the screw nut 74. Of course, other types of linear movement mechanisms can be used as needed and/or desired.

The rotary encoder 46a is a rotation detecting device that detects a rotation amount of the motor 46b. In the illustrated embodiment, the rotary encoder 46a is an electro-mechanical device that converts the angular position of a shaft, axle, gear or other rotating part of the motor 46b to an analog or digital position signal that is sent to the controller 26. Using feedback control based on the position signal from the rotary encoder 46a, the controller 26 sends an operating signal to the motor 46b for controlling the operation (rotation) of the motor 46b to output a desired amount rotational movement to the linear movement mechanism 68 via the gear reduction unit 70. In this way, the controller 26 can operate the linear movement mechanism 68 to obtain the desired seat position (i.e., change an overall length of the telescoping seatpost part 14).

In this illustrated embodiment, the motor 46b is a reversible electric motor that is rigidly secured to the second end 32 of the outer tube 22. The gear reduction unit 70 reduces the rotational speed of the motor 46b while maintaining a constant output torque. In this way, the gear reduction unit 70 transfers the rotation of the motor 46b to the linear movement mechanism 68 at a lower speed and a higher torque. A sleeve joint 69 fastens the lower end of the drive screw 72 to an output shaft 70a of the gear reduction unit 70 so that the drive screw 72 rotates in response to operation of the motor 46b. Reversible electric motors and gear reduction units, such as the motor 46b and the gear reduction unit 70, are well known, and thus, the motor 46b and the gear reduction unit 70 will not be discussed and/or illustrated in detail Generally speaking, the linear movement mechanism 68 is operatively disposed between the inner and outer tubes 20 and 22 to change the overall length of the telescoping seatpost part 14. In this illustrated embodiment, the drive screw 72 of the linear movement mechanism 68 is axially stationary with respect to the outer tube 22, but rotates with respect to the outer tube 22. On the other hand, the screw nut 74 of the linear movement mechanism 68 is axially and rotationally stationary with respect to the inner tube 20. Thus, rotation of the drive screw 72 by the motor 46b causes the inner tube 20 to move axially with respect to the outer tube 22 for expanding and contracting the overall length of the telescoping seatpost part 14.

In this illustrated embodiment, the drive source 46 further includes a pawl release structure 80 that mainly includes a first cam portion 81 and a second cam portion 82. The pawl release structure 80 moves linearly within at least one of the inner and outer tubes 20 and 22 such that the first and second cam portions 81 and 82 of the pawl release structure 80 selectively moves the first and second stop pawl members 61 and 62, respectively, between the lock position and the movable position. The pawl release structure 80 selectively disengages the first and second stop pawl members 61 and 62 from a corresponding one of the first and second ratchet teeth 54 and 56. The pawl release structure 80 moves in a first axial direction of the inner and outer tubes 20 and 22 to disengage the first stop pawl members 61 from the first ratchet teeth 54. The pawl release structure 80 moves in a second axial direction of the inner and outer tubes 20 and 22, which is different from the first axial direction, to disengage the second stop pawl members 62 from the second ratchet teeth 56.

The linear movement mechanism 68 of the drive source 46 moves the first and second pawl structures 52a and 52b in a first (downward) axial direction of the inner and outer tubes 20 and 22 to disengage the first stop pawl members 61 from the first ratchet teeth 54. The linear movement mechanism 68 of the drive source 46 moves the pawl release structure 80 in a second (upward) axial direction of the inner and outer tubes 20 and 22 to disengage the second stop pawl members 62 from the second ratchet teeth 56.

Basically, the linear movement mechanism 68 selectively moves the first and second cam portions 81 and 82 of the pawl release structure 80 together in an axial direction of the inner and outer tubes 20 and 22. The first cam portion 81 is movably arranged with respect to the pawl holder 60 such that engagement of the first cam portion 81 with the first stop pawl members 61 causes disengagement of the first stop pawl members 61 from the first ratchet teeth 54. The second cam portion 82 is movably arranged with respect to the pawl holder 60 such that engagement of the second cam portion 82 with the second stop pawl members 62 causes disengagement of the second stop pawl members 62 from the second ratchet teeth 56. The linear movement mechanism 68 moves the first cam portion 81 of the pawl release structure 80 into engagement with the first stop pawl members 61 of the first pawl structure 52a when the linear movement mechanism 68 is operated to shorten the overall height of the telescoping seatpost part 14. The linear movement mechanism 68 moves the second cam portion 82 of the pawl release structure 80 into engagement with the second stop pawl members 62 of the second pawl structure 52b when the linear movement mechanism 68 is operated to lengthen the overall height of the telescoping seatpost part 14. The linear movement mechanism 68 selectively moves the first and second cam portions 81 and 82 of the pawl release structure 80 into engagement with the first and second stop pawl members 61 and 62 to disengage the first and second stop pawl members 61 and 62 from the first and second ratchet teeth 54 and 56, respectively prior to moving the inner and outer tubes 20 and 22 relative to each other in response to operation of the linear movement mechanism 68 of the drive source 46.

In height shortening operation of the overall height of the telescoping seatpost part 14, the linear movement mechanism 68 causes the first cam portion 81 of the pawl release structure 80 to move downward in an axial direction into direct engagement with the first stop pawl members 61. This downward movement of the first cam portion 81 then causes the first stop pawl members 61 to pivot out of engagement from the first ratchet teeth 54 before moving the inner tube 20 relative to the outer tube 22. Thus, a prescribed amount of lost motion occurs in the linear movement mechanism 68 between the point that the screw nut 74 starts moving axially and the point that the inner tube 20 starts moving axially relative to the outer tube 22. Once the first stop pawl members 61 disengage from the first ratchet teeth 54, further operation of the linear movement mechanism 68 causes the first cam portion 81 to directly contact the pawl holder 60 and to move the inner tube 20 downward relative to the outer tube 22. During this height shortening operation of the overall height of the telescoping seatpost part 14, the second stop pawl members 62 are ratcheted against the second teeth of 56.

In a height lengthening operation of the overall height of the telescoping seatpost part 14, the linear movement mechanism 68 causes the second cam portion 82 of the pawl release structure 80 to move upward in an axial direction into direct engagement with the second stop pawl members 62. This upward movement of the second cam portion 82 then causes the second stop pawl members 62 to pivot out of engagement from the second ratchet teeth 56 before moving the inner tube 20 relative to the outer tube 22. Thus, again, a prescribed amount of lost motion occurs in the linear movement mechanism 68 between the point that the screw nut 74 starts moving axially and the point that the inner tube 20 starts moving axially relative to the outer tube 22. Once the second stop pawl members 62 disengage from the second ratchet teeth 56, further operation of the linear movement mechanism 68 causes the second cam portion 82 to directly contact the pawl holder 60 and to move the inner tube 20 upward relative to the outer tube 22. During this height lengthening operation of the overall height of the telescoping seatpost part 14, the first stop pawl members 61 are ratcheted against the first ratchet teeth 54.

The linear movement mechanism 68 selectively moves the inner tube 20 relative to the outer tube 22 in a first (downward) axial direction that decreases an overall effective length of the height adjustable seatpost. The linear movement mechanism 68 selectively moves the inner tube 20 relative to the outer tube 22 in a second (upward) axial direction that is opposite the first (downward) axial direction to increase the overall effective length of the height adjustable seatpost.

The controller 26 operatively connected to the drive source 46 with the controller 26 having a plurality of different preset seat position settings that selectively operate the drive source 46 to move the inner and outer tubes 20 and 22 relative to each other. The controller 26 uses signals from the rotary encoder 46a, which detects a rotation amount of the motor 46b when the controller 26 operates the motor 46b to determine an operation amount of the motor 46b. The rotary encoder 46a determines the rotational amount of the motor 46b for determining the preset seat positions.

Figure 18:
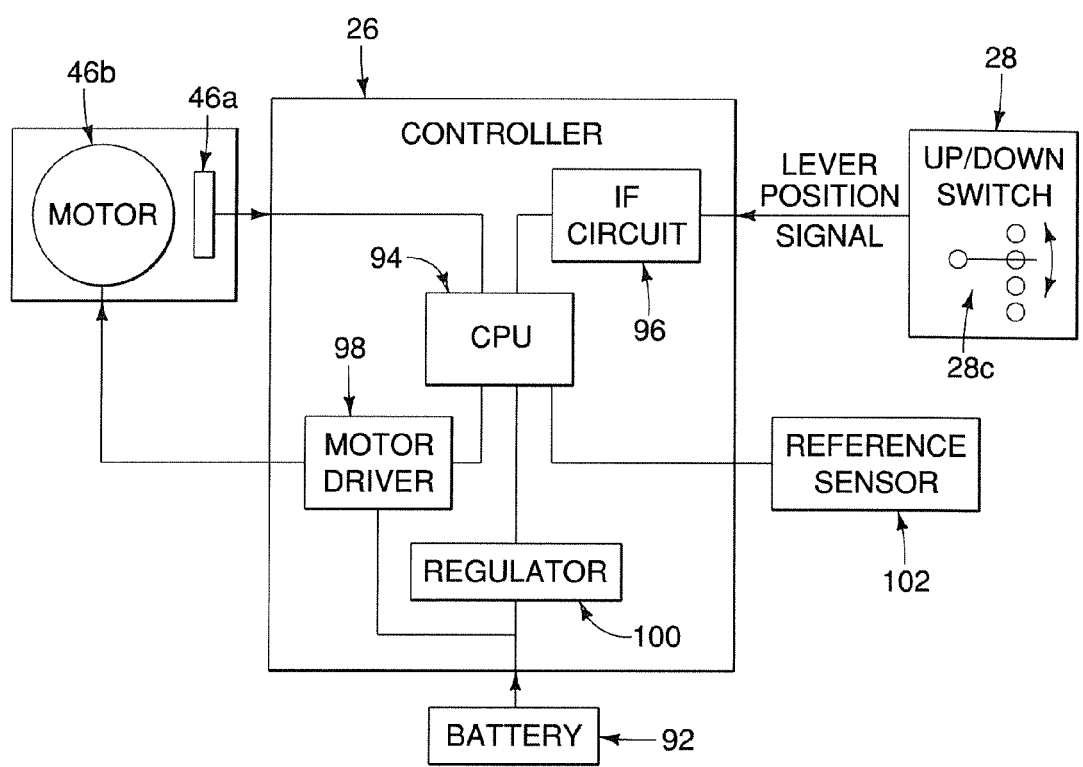
FIG. 18 is a schematic electrical diagram for the telescoping seatpost part illustrated in FIGS. 1 to 17.

Referring now to FIG. 18, basically, the motor 46b receives electrical power (electricity) from a battery 92 via the controller 26. In particular, the battery 92 is electrically connected to the motor 46b via the controller 26. The motor 46b is operatively connected to the linear movement mechanism 68 to selectively extend or retract the inner tube 20 relative to the outer tube 22. The controller 26 is operatively connected to the motor 46b with the controller 26 having a plurality of different preset seat position settings that selectively operate the motor 46b to move the inner tube 20 relative to the outer tube 22. In this illustrated embodiment, the controller 26 includes among other things, a central processing unit or CPU 94, an intermediate frequency (IF) circuit 96, a motor driver 98 and a regulator 100. The controller 26 is powered by the battery 92 that is mounted completely within the inner tube 20. In this embodiment, the controller 26 operates the height adjustment device 24 by selectively supplying electricity to the height adjustment device 24 based on the signal from the operating switch 28.

The central processing unit 94 preferably includes a microcomputer. The central processing unit 94 can also include other conventional components such as an input interface circuit, an output interface circuit, and storage devices such as a ROM (Read Only Memory) device and a RAM (Random Access Memory) device. The intermediate frequency (IF) circuit 96, the motor driver 98 and the regulator 100 are conventional components that are well known in the field. Thus, the components 96, 98 and 100 will not be discussed in detail herein.

The operating switch 28 is operatively connected to the controller 26, and thus operatively connected to the motor 46b. The operating switch 28 generates a motor control signal to operate the motor 46b in response to operation of the operating switch 28. The electrical power from the battery 92 is supplied to the operating switch 28 via the controller 26 for generating the motor control signals.

The controller 26 drives the motor 46b until the seat 13 reaches the preset seat position that corresponds to the current lever position based on a signal from the rotary encoder 46a. In the illustrated embodiment, the first prescribed pitch P1 distance D1 is preferably 5.0 mm, with each of the preset seat positions being preferably a multiple number of the first prescribed pitch P1. However, for the sake of simplicity of illustration, the expansion and retraction operations shown in FIGS. 6 to 17, only illustrate changing the overall length of the telescoping seatpost part 14 by a single tooth position in each direction. In the case of an expansion operation (i.e., raising the inner tube 20 with respect to the outer tube 22) of the telescoping seatpost part 14, the controller 26 drives the motor 46b as seen in FIGS. 6 to 11. In the case of an expansion operation (i.e., raising the inner tube 20 with respect to the outer tube 22) of the telescoping seatpost part 14, the controller 26 drives the motor 46b as seen in FIGS. 6 to 11. In the case of a retraction operation (i.e., lowering the inner tube 20 with respect to the outer tube 22) of the telescoping seatpost part, the controller 26 drives the motor 46b as seen in FIGS. 13 to 17.

During an expansion operation, the controller 26 drives the motor 46b so that the drive screw 72 rotates to axially move the screw nut 74 in an upward direction. In particular, the screw nut 74 and the pawl release structure 80 initially move together as a unit upward from the rest (starting) position shown in FIG. 7 to an intermediate position (e.g., upward by 1 mm from the starting position) shown in Figure deleted, such that the lower cam portion 82 of the pawl release structure 80 contacts the second stop pawl members 62. Further upward movement of the screw nut 74 and the pawl release structure 80 (e.g., upward by 2.1 mm from the starting position) results in the lower cam portion 82 of the pawl release structure 80 starting to pivot the second stop pawl members 62 out of engagement from the second ratchet teeth 56 of the first ratchet tooth structure 50a before moving the inner tube 20 relative to the outer tube 22. Further upward movement of the screw nut 74 and the pawl release structure 80 (e.g., upward by 3.5 mm from the starting position) results in the lower cam portion 82 of the pawl release structure 80 pivoting the second stop pawl members 62 completely out of engagement from the second ratchet teeth 56 of the first ratchet tooth structure 50a before moving the inner tube 20 relative to the outer tube 22. Further upward movement of the screw nut 74 and the pawl release structure 80 (e.g., upward by 7 mm from the starting position) results in the lower cam portion 82 of the pawl release structure 80 moving the pawl holder 60 and the inner tube 20 upward as a unit relative to the outer tube 22. Further upward movement of the screw nut 74 and the pawl release structure 80 (e.g., upward by 9 mm from the starting position) results in the pawl holder 60 being moved to slightly higher than the next seat position such that the first stop pawl members 61 engage the next higher one of the first ratchet teeth 54 and the second stop pawl members 62 are contacting areas between two teeth of retraction the second ratchet teeth 56. During this upward movement of the screw nut 74 and the pawl release structure 80, the first stop pawl members 61 were ratcheted upward against the cam surface 54b of one of the first ratchet teeth 54 of the first ratchet tooth structure 50a. Next, as shown in FIG. 10, the controller 26 drives the motor 46b in the opposite direction so that the drive screw 72 rotates to axially move the screw nut 74 in a downward direction. In particular, the downward movement of the screw nut 74 and the pawl release structure 80 from the position shown in FIG. 9 to an intermediate position (e.g., upward by 8.4 mm from the starting position) shown in FIG. 10 results in the first stop pawl members 61 engage the next higher one of the pawl abutments 54a of the first ratchet teeth 54 and the second stop pawl members 62 being located adjacent the next higher one of the pawl abutments 546a of the second ratchet teeth 56. Finally, further downward movement of the screw nut 74 and the pawl release structure 80 (e.g., upward by 5 mm from the starting position) results in the ending seat position of the expansion operation in which the first and second movement stop pawl members 61 and 62 engage the first and second ratchet teeth 54 and 56 to lock the inner tube 20 to the outer tube 22 with the drive screw 72 and the screw nut 74 of the drive source 46 being unloaded. While the expansion operation illustrated in FIGS. 7 to 10 shows only the inner tube 20 being raised by the first prescribed pitch P1 between two adjacent ones of the pawl abutments 54a, preferably, an expansion operation raises the inner tube 20 by a distance corresponding to several of the pawl abutments 54a of the first ratchet teeth 54.

During a retraction operation, the controller 26 drives the motor 46b so that the drive screw 72 rotates to axially move the screw nut 74 in a downward direction. In particular, the screw nut 74 and the pawl release structure 80 initially move together as a unit downward from the rest (starting) position shown in FIG. 14 to an intermediate position (e.g., downward by 1 mm from the starting position), such that the upper cam portion 81 of the pawl release structure 80 contacts the first stop pawl members 61. Further downward movement of the screw nut 74 and the pawl release structure 80 (e.g., downward by 2.1 mm from the starting position) results in the upper cam portion 81 of the pawl release structure 80 starting to pivot the first stop pawl members 61 out of engagement from the first ratchet teeth 54 before moving the inner tube 20 relative to the outer tube 22. Further downward movement of the screw nut 74 and the pawl release structure 80 (e.g., upward by 3.4 mm from the starting position) results in the upper cam portion 81 of the pawl release structure 80 pivoting the first stop pawl members 61 completely out of engagement from the first ratchet teeth 54 before moving the inner tube 20 relative to the outer tube 22. Further downward movement of the screw nut 74 and the pawl release structure 80 (e.g., upward by 7 mm from the starting position) results in the upper cam portion 81 of the pawl release structure 80 moving the pawl holder 60 and the inner tube 20 downward as a unit relative to the outer tube 22 such that the first stop pawl members 61 are in position to engage the next lower one of the first ratchet teeth 54 while the second stop pawl members 62 are contacting areas between two of the second ratchet teeth 56. During this downward movement of the screw nut 74 and the pawl release structure 80, the second stop pawl members 62 were ratcheted upward against the cam surface 56b of one of the second ratchet teeth 56. Next, the controller 26 drives the motor 46b in the opposite direction so that the drive screw 72 rotates to axially move the screw nut 74 in an upward direction. In particular, the upward movement of the screw nut 74 and the pawl release structure 80 (e.g., downward by 5 mm from the starting position) results in the upper cam portion 81 of the pawl release structure 80 starting to separate from the first stop pawl members 61 which are pushed to engage the first ratchet teeth 54 with the second stop pawl members 62 contacting an area between two of the second ratchet teeth 56. Finally, the screw nut 74 and the pawl release structure 80 (e.g., downward by 5 mm from the starting position) results in the ending seat position of the retraction operation in which the first and second movement stop pawl members 61 and 62 engage the first and second ratchet teeth 54 and 56 to lock the inner tube 20 to the outer tube 22 with the drive screw 72 and the screw nut 74 of the drive source 46 being unloaded. While the illustrated retraction operation shows only the inner tube 20 being lowered by the first prescribed pitch P1 between two adjacent ones of the pawl abutments 54a, preferably, a retraction operation lowers the inner tube 20 by a distance corresponding to several of the pawl abutments 54a of the first ratchet teeth 54.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle seatpost assembly on level ground. Accordingly, these terms, as utilized to describe the present invention should be interpreted relative to a bicycle equipped with the bicycle seatpost assembly as used in the normal riding position on level ground.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A height adjustable seatpost assembly comprising:
  first and second tubes being telescopically arranged, the first and second tubes being relatively actuated with respect to each other to change an overall length of the height adjustable seatpost assembly;
  a first ratchet arrangement including a set of first ratchet teeth having a first pitch and a first stop pawl member being movably coupled with respect to the first ratchet teeth between a first lock position and a first free position, the first stop pawl member being engaged with one of the first ratchet teeth in the first lock position to prevent contraction of the first and second tubes; and a second ratchet arrangement including a set of second ratchet teeth having a second pitch that is smaller than the first pitch and a second stop pawl member being movably coupled with respect to the second ratchet teeth between a second lock position and a second free position, the second stop pawl member being engaged with one of the second ratchet teeth in the second lock position to prevent expansion of the first and second tubes.

2. The height adjustable seatpost assembly according to claim 1, wherein the second pitch is equal to the first pitch divided by an integral number.

3. The height adjustable seatpost assembly according to claim 1, wherein the second pitch is equal to one-half of the first pitch.

4. The height adjustable seatpost assembly according to claim 1, further comprising
a pawl release structure that selectively disengages at least one of the first and second stop pawl members from a corresponding one of the first and second ratchet teeth.

5. The height adjustable seatpost assembly according to claim 4, wherein
the pawl release structure moves in a first axial direction of the first and second tubes to disengage the first stop pawl member from the first ratchet teeth, and
the pawl release structure moves in a second axial direction of the first and second tubes, which is different from the first axial direction, to disengage the second stop pawl member from the second ratchet teeth.

6. The height adjustable seatpost assembly according to claim 4, wherein
the pawl release structure having a first cam portion and a second cam portion, the first cam portion being movably arranged such that engagement of the first cam portion with the first stop pawl member causes disengagement of the first stop pawl member from the first ratchet teeth, and the second cam portion being movably arranged such that engagement of the second cam portion with the second stop pawl member causes disengagement of the second stop pawl member from the second ratchet teeth.

7. The height adjustable seatpost assembly according to claim 1, wherein
the first tube is disposed inside the second tube with the pawl structure being mounted to the first tube and the first and second ratchet teeth being mounted to an interior surface of the second tube.

8. The height adjustable seatpost assembly according to claim 1, further comprising
a linear movement mechanism having a drive screw and a screw nut, with the screw nut engaged with the drive screw such that the screw nut moves in an axial direction of the drive screw in response to relative rotational movement between the drive screw and the screw nut.

9. The height adjustable seatpost assembly according to claim 1, further comprising
an electric motor operatively coupled to the first and second tubes such that actuation of the electric motor telescopically adjusts the first and second tubes relative to each other.

10. The height adjustable seatpost assembly according to claim 1, further comprising
a controller operatively connected to a drive source with the controller having a plurality of different preset seat position settings that selectively operate the drive source to move the first and second tubes relative to each other.

11. The height adjustable seatpost assembly according to claim 1, further comprising
a rotation detecting device that detects a rotation of a drive source when a controller operates the drive source to change an overall length of the height adjustable seatpost assembly.

* * * * *